US010850278B2

(12) United States Patent
Wiktor

(10) Patent No.: US 10,850,278 B2
(45) Date of Patent: Dec. 1, 2020

(54) MICROREACTOR ARRAY PLATFORM

(71) Applicant: ARIZONA BOARD OF REGENTS ON BEHALF OF ARIZONA STATE UNIVERSITY, Scottsdale, AZ (US)

(72) Inventor: Peter Wiktor, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 510 days.

(21) Appl. No.: 15/114,894

(22) PCT Filed: Jan. 28, 2015

(86) PCT No.: PCT/US2015/013198
§ 371 (c)(1),
(2) Date: Jul. 28, 2016

(87) PCT Pub. No.: WO2015/116627
PCT Pub. Date: Aug. 6, 2015

(65) Prior Publication Data
US 2016/0339427 A1    Nov. 24, 2016

Related U.S. Application Data

(60) Provisional application No. 61/933,054, filed on Jan. 29, 2014.

(51) Int. Cl.
*B01L 3/00* (2006.01)
*B01J 19/00* (2006.01)
*B01L 3/02* (2006.01)

(52) U.S. Cl.
CPC ....... *B01L 3/50853* (2013.01); *B01J 19/0046* (2013.01); *B01L 3/50851* (2013.01);
(Continued)

(58) Field of Classification Search
CPC .............. B01L 2200/027; B01L 2200/0689
(Continued)

(56) References Cited

U.S. PATENT DOCUMENTS 4,683,195 A    7/1987 Mullis et al.
5,219,528 A *  6/1993 Clark ................... B01L 3/5025
                                                422/527
(Continued)

FOREIGN PATENT DOCUMENTS

WO    2013/063126 A2    5/2014

OTHER PUBLICATIONS

Zhou et al., Microfluidic PicoArray synthesis of oligodeoxynucleotides and simultaneous assembling of multiple DNA sequences, Nucleic Acids Research, 2004, 32(18):5409-17.
(Continued)

*Primary Examiner* — Natalia Levkovich
(74) *Attorney, Agent, or Firm* — Quarles & Brady LLP

(57) ABSTRACT

A microreactor array platform and method for sealing a reagent in microreactors of an array of microreactors are provided. The microreactor array platform includes an array of microreactors, and a sealing film having a first surface and an opposite second surface, the sealing film configured to movably seal the array of microreactors. The microreactor array platform also includes an injector for delivering a reagent into the array of microreactors via a fluid path between the array and the second surface of the sealing film, and an applicator for directing a sealing liquid against the first surface of the sealing film. The microreactor array platform further includes a system for creating a pressure differential between the reagent in the injector and a space between the array of microreactors and the second surface of the sealing film.

18 Claims, 11 Drawing Sheets

(52) U.S. Cl.
CPC ............... B01J 2219/00286 (2013.01); B01J 2219/00317 (2013.01); B01J 2219/00396 (2013.01); B01J 2219/00414 (2013.01); B01J 2219/00416 (2013.01); B01J 2219/00418 (2013.01); B01L 3/0282 (2013.01); B01L 3/0293 (2013.01); B01L 2200/025 (2013.01); B01L 2200/0642 (2013.01); B01L 2200/0684 (2013.01); B01L 2200/0689 (2013.01); B01L 2200/141 (2013.01); B01L 2200/142 (2013.01); B01L 2200/16 (2013.01); B01L 2300/044 (2013.01); B01L 2300/046 (2013.01); B01L 2300/0636 (2013.01); B01L 2300/0819 (2013.01); B01L 2300/0822 (2013.01); B01L 2300/0864 (2013.01); B01L 2300/161 (2013.01); B01L 2300/165 (2013.01); B01L 2400/0409 (2013.01); B01L 2400/049 (2013.01); B01L 2400/0487 (2013.01); B01L 2400/0605 (2013.01); B01L 2400/0666 (2013.01); B01L 2400/0683 (2013.01); B01L 2400/0688 (2013.01)

(58) Field of Classification Search
USPC ........................................ 422/603, 503, 504
See application file for complete search history.

(56) References Cited

U.S. PATENT DOCUMENTS

| | | | |
|---|---|---|---|
| 5,445,934 | A | 8/1995 | Fodor et al. |
| 5,639,423 | A | 6/1997 | Northrup et al. |
| 5,807,522 | A | 9/1998 | Brown et al. |
| 6,110,426 | A | 8/2000 | Shalon et al. |
| 6,143,496 | A | 11/2000 | Brown et al. |
| 6,485,690 | B1 * | 11/2002 | Pfost ............... B01J 19/0046 422/552 |
| 7,217,520 | B2 | 5/2007 | Tsinberg et al. |
| 7,311,794 | B2 | 12/2007 | Joseph et al. |
| 7,682,565 | B2 | 3/2010 | Linton et al. |
| 8,252,581 | B2 | 8/2012 | Joseph et al. |
| 2001/0012537 | A1 | 8/2001 | Anderson et al. |
| 2007/0202538 | A1 * | 8/2007 | Glezer ............... B01L 3/5025 435/7.1 |
| 2010/0167414 | A1 | 7/2010 | Bianchessi et al. |
| 2010/0252128 | A1 | 10/2010 | Gong et al. |
| 2010/0298163 | A1 | 11/2010 | Juncker et al. |
| 2012/0315199 | A1 | 12/2012 | Neltner et al. |

OTHER PUBLICATIONS

Ziauddin et al., Microarrays of cells expressing defined cDNAs, Nature, 2001, 411:107-110.
Angenendt et al., Generation of high density protein microarrays by cell-free in situ expression of unpurified PCR products, Molecular & Cellular Proteomics, 2006, 5(9):1658-66.
Blake et al., Wetting at High Capillary Numbers, 12th International Coating Science and Technology Symposium, Sep. 23-25, 2004, Rochester, NY, 129-34.
Blanchard et al., High-density oligonucleotide arrays, Biosensors and Bioelectronics, 1996, 11(6/7):687-90.
Brenan et al., Nanoliter high-throughput PCR for DNA and RNA profiling, Methods in Molecular Biology, 2009, 496:161-74.
Chou et al., Optimization of probe length and the number of probes per gene for optimal microarray analysis of gene expression, Nucleic Acids Research, 2004, 32(12):e99 (8 pages).
Chou et al., Imprint Lithography with 25-Nanometer Resolution, Science, Apr. 1996, 272(5258):85-7.
Du et al., SlipChip, Lab on a Chip, 2009, 9(16):2286-92.
Dunn et al., Quantitation of neutrophil phagocytosis, using fluorescent latex beads. Correlation of microscopy and flow cytometry, Journal of Laboratory and Clinical Medicine, 1981, 98(3):374-81.
Engvall et al., Enzyme-linked immunosorbent assay (ELISA) quantitative assay of immunoglobulin G, Immunochemistry, 1971, 8(9):871-4.
Gong et al., Microfluidic handling of PCR solution and DNA amplification on a reaction chamber array biochip, Biomedical Microdevices, 2006, 8(2):167-76.
Gosalia et al., Printing chemical libraries on microarrays for fluid phase nanoliter reactions, PNAS USA, Jul. 2003, 100(15):8721-6.
Greener et al., Rapid, cost-efficient fabrication of microfluidic reactors in thermoplastic polymers by combining photolithography and hot embossing, Lab on a Chip, 2010, 10:522-4.
Groebe et al., Putting thought to paper: a microARCS protease screen, Journal of Biomolecular Screening, 2003, 8(6):668-75.
He et al., Printing protein arrays from DNA arrays, Nature Methods, 2008, 5(2):175-7.
Inglese et al., High-throughput screening assays for the identification of chemical probes, Nature Chemical Biology, 2007, 3(8):466-79.
Jackman et al., Fabricating large arrays of microwells with arbitrary dimensions and filling them using discontinuous dewetting, Analytical Chemistry, 1998, 70(11):2280-7.
Kinpara et al., A Picoliter Chamber Array for Cell-Free Protein Synthesis, Journal of Biochemistry, 2004, 136(2):149-54.
Kuruvilla et al., Dissecting glucose signalling with diversity-oriented synthesis and small-molecule microarrays, Nature, 2002, 416:653-7.
Leamon et al., A massively parallel PicoTiterPlate based platform for discrete picoliter-scale polymerase chain reactions, Electrophoresis, 2003, 24(21):3769-77.
Lisi et al., A fluorescence immunoassay for soluble antigens employing flow cytometric detection, Clinica Chimica Acta, 1982, 120(2):171-9.
Liu et al., Rapid distribution of a liquid column into a matrix of nanoliter wells for parallel real-time quantitative PCR, Sensors and Actuators B: Chemical, 2009, 135(2):671-7.
Liu et al., SlipChip for Immunoassays in Nanoliter Volumes, Analytical Chemistry, 2010, 82(8):3276-82.
Ma et al., Nanoliter homogenous ultra-high throughput screening microarray for lead discoveries and IC50 profiling, ASSAY and Drug Development Technologies, 2005, 3(2):177-87.
Matsubara et al., Application of a microchamber array for DNA amplification using a novel dispensing method, Archives of Histology and Cytology, 2002, 65(5):481-8.
Mullis et al., Specific enzymatic amplification of DNA in vitro: the polymerase chain reaction, Cold Spring Harbor Symposia on Quantitative Biology, 1986, vol. 51, pp. 263-273.
Nagai et al., Development of A Microchamber Array for Picoliter PCR, Analytical Chemistry, 2001, 73(5):1043-7.
Nikkhah et al., Isotropically Etched Silicon Microarrays for Rapid Breast Cancer Cell Capture, IEEE Sensors Journal, 2013, 13(3):1125-32.
Okano et al., Cell-free Protein Synthesis in a Microchamber Revealed the Presence of an Optimum Compartment Volume for High-order Reactions, ACS Synthetic Biology, 2014, 3(6):347-52.
Park, Nanoliter Reactor Arrays for Antibiotic Study, Bulletin of the Korean Chemical Society, 2007, 28(10):1709-14.
Ramachandran et al., Self-Assembling Protein Microarrays, Science, 2004, 305(5680):86-90.
Ramakrishnan et al., An assessment of Motorola CodeLink microarray performance for gene expression profiling applications, Nucleic Acids Research, 2002, 30(7):e30 (12 pages).
Ramalingam et al., Real-time PCR array chip with capillary-driven sample loading and reactor sealing for point-of-care applications, Biomedical Microdevices, 2009, 11(5):1007-20.
Reddy et al., Dynamics of low capillary number interfaces moving through sharp features, Physics of Fluids, 2005, 17:122104-1-122104-6.
Ressine et al., Porous silicon protein microarray technology and ultra-/superhydrophobic states for improved bioanalytical readout, Biotechnology Annual Review, 2007, 13:149-200.
Rissin et al., Single-molecule enzyme-linked immunosorbent assay detects serum proteins at subfemtomolar concentrations, Nature Biotechnology, 2010, 28(6):595-9.

(56) References Cited

OTHER PUBLICATIONS

Sakakihara et al., A single-molecule enzymatic assay in a directly accessible femtoliter droplet array, Lab on a Chip, 2010, 10(24):3355-62.
Sathuluri et al., Microsystems technology and biosensing, Adv. Biochem. Engin./Biotechnol., 2008, 109:285-350.
Shannon et al., The Mathematical Theory of Communication, Tenth Printing 1964, The University of Illinois Press (Urbana), Copyright 1949 Board of Trustees of the University of Illinois, 132 pages.
Shockley, Electrons and Holes in Semiconductors, Seventh Printing 1959, Copyright 1950 D. Van Nostrand Company Inc., 576 pages.
Siuti et al., Cell Free Translation in Engineered Picoliter Volume Containers, Annual ORNL Biomedical Science and Engineenng Center Conference, Jun. 2009, pp. 1-4.
Takatsy, The use of spiral loops in serological and virological micro-methods, Acta microbiologica, 1955, 3(1-2):191-202.
Takulapalli et al., High Density Diffusion-Free Nanowell Arrays, Journal of Proteome Research, 2012, 11(8):4382-91.
Vignali, Multiplexed particle-based flow cytometric assays, Journal of Immunological Methods, 2000, 243(1-2):243-55.
Watson et al., Genetical Implications of the Structure of Deoxyribonucleic Acid, Nature, 1953, 171:964-7.
Watson et al., Molecular Structure of Nucleic Acids; a Structure for Deoxyribose Nucleic Acid, Nature, 1953, 171:737-8.
Wiktor et al., Antigenic Properties of Rabies Virus Components, Journal of Immunology, 1973, 110(1):269-76.
Woolley et al., Functional Integration of PCR Amplification and Capillary Electrophoresis in a Microfabricated DNA Analysis Device, Analytical Chemistry, 1996, 68(23):4081-6.
Yalow et al., Immunoassay of endogenous plasma insulin in man, Journal of Clinical Investigation, 1960, 39(7):1157-75.
Yamamoto et al., Evaluation of Cell-free Protein Synthesis Using PDMS-based Microreactor Arrays, Analytical Sciences, 2008, 24:243-6.
Zhang et al., Miniaturized PCR chips for nucleic acid amplification and analysis: latest advances and future trends, Nucleic Acids Research, 2007, 35(13):4223-37.

\* cited by examiner

MICROREACTOR ARRAY PLATFORM

This application is a 371 application of PCT/US2015/013198 filed Jan. 28, 2015 which claims the benefit of, and incorporates herein by reference, U.S. Provisional Application No. 61/933,054 filed on Jan. 29, 2014.

This invention was made with government support under grant number GM106704 awarded by the National Institutes of Health. The government as certain rights in the invention.

BACKGROUND

The present disclosure relates generally to devices, systems and methods for controlling micro-reactions and, in particular, to devices, systems and methods for controlling micro-reactions in high throughput parallel assays.

In the late 19th century, Louis Pasteur and Robert Koch performed laboratory experiments establishing links between microscopic organisms and infectious diseases such tuberculosis, cholera, anthrax and rabies. These led later scientists, such as Lister, Fleming and Salk to develop antiseptics, antibiotics and vaccines with profound effect on worldwide human health. Early experiments in the life sciences were all performed literally in vitro (glass) using laboratory test containers such as flasks, beakers, test tubes, mouth pipettes, vials, capillary tubes, microscope slides or Petri dishes. All of these have common characteristics: they are used for single experiments and are all roughly the size of a human hand; reflecting the manual nature of early experiments in the life sciences. In the mid-20th century, experimental biology began to evolve from manual, single experiments performed in glassware towards automated, parallel, 'high throughput' experiments in plastic and other materials. This shift was due to several key innovations from the ~1950's: including the discovery of the double helix structure of DNA and the developments of information theory, transistors, mass-produced plastics, microtiter plates and immunoassays. Discovering the structure of DNA revealed that genetic information is digital. Together with development of information theory, this led to understanding how information stored in DNA is precisely reproduced in nature. Eventually decoding this information identified millions of unique molecules such as DNAs, RNAs, peptides and proteins that can be precisely reproduced and studied in the laboratory. Transistors and information theory led to advanced electronics and computers which enabled sensors, automation and miniaturization for large scale parallel experiments and statistical analysis of the vast amounts of resulting data. Mass produced plastics replaced glassware as the primary material used for laboratory experiments. Immunoassays, based on plastic microtiter plates, were prototypical parallel biology assays.

Currently much is known about molecules involved in life processes and their interactions with each other and other chemical compounds. High throughput parallel assays are needed to identify additional 'biomolecules' and study their activity. DNA of the simplest known living organisms has more than 100,000 base-pairs and ~200 genes. Human DNA has ~3 billion base-pairs and >20,000 genes. Proteins coded by these genes interact with each other in complex aqueous chemical reactions. Various methods exist to decode the base-pair sequence of DNA. Some methods involve billions of chemical reactions per run. Sequencing information is used to define precise chemical formulas of biomolecules. The life sciences now use DNA sequencing information to study genetic processes at the molecular level. Understanding the complexity of life processes requires vast amounts of statistical data based on large numbers of repeated assays. Higher quality data means that fewer assays need to be run to get statistically meaningful results. These are all compelling needs for miniaturized, highly parallel assay platforms to simultaneously run many independent biology experiments quickly, efficiently, inexpensively, reliably and consistently.

Applications for high throughput assays include: gene expression profiling, genotyping, DNA profiling, polymerase chain reaction (PCR), DNA sequencing, immunoassays, high throughput screening (HTS) and high throughput cell analysis. Various different types of high throughput platforms are needed to carry out these various assays depending on specific applications such as basic biology research, environmental monitoring, detection of select agents, forensics, proteomics, functional genomics, epidemiology, drug discovery, clinical molecular diagnostics, or personalized medicine. In general, assays should be carried out efficiently in terms of their use of space, time, equipment, labor, samples, reagents and supplies.

Chemical reactions in living organisms involve free floating molecules in liquid water. Therefore to study similar reactions in the laboratory requires that experiments also take place in liquid water. The molecules involved in these reactions must be constrained to keep them from diffusing away during the experiment. For some assays, molecules can be chemically bound to a surface to prevent diffusion. For example, microarrays may consist of molecular probes bound to a surface in an orderly array pattern of rows and columns. The microarray surface is flooded with a sample containing various different 'target' molecules that bind to the probes. After washing, the target molecules are detected and identified based on where they bind in the array. However other types of assays involve unbound, free floating molecules. For example, enzyme-linked immunosorbent assay (ELISA) uses chromogenic or fluorogenic substrates in solution that react with enzymes bound to a surface. These substrates must be physically contained together with the enzymes during an assay. Similarly, polymerase chain reaction (PCR) amplifies DNA template molecules freely floating in a buffer solution. PCR is initiated by primer molecules that must be contained together with the DNA templates during an assay.

The microtiter plate (microwell plate or microplate) was the first high throughput parallel platform for biological assays. It was originally developed to facilitate serological titrations to detect influenza infections. The original microplate consisted of an 8×12 array of wells in a single hand-sized plastic plate. The wells were physically separated from each other so that 96 separate chemical reactions could take place simultaneously without diffusion between neighboring wells. Chemicals were identified by their positions in the plate. The microplate did not become prevalent until the late 1950's when mass produced injection molded plastic was developed. Currently microplates are used for a wide variety of applications including immunoassays, high throughput screening, quantitative polymerase chain reaction (qPCR), and cell biology. Microplates typically have 96, 384 or 1536 wells. The wells are large enough, greater than 10 µl, so that they can be filled using manual or automated pipettes. If necessary, microplates are sealed manually with adhesive film.

Compared to microplates, microarrays dramatically increase the number of experiments that can be performed in a single assay. High throughput DNA microarrays were developed originally for gene expression profiling to identify mRNA molecules expressed by genes of living organisms. Typically, short DNA probes, complimentary to an organism's mRNA are immobilized on a surface in an array pattern. The surface of the microarray is flooded with a test sample from an organism. The mRNA target molecules in the sample are identified by where they hybridize to probes on the microarray. The original DNA microarrays synthesized DNA probes directly on the microarray surface using photolithographic directed synthesis of oligonucleotides. Later microarrays synthesized probes in situ using piezoelectric inkjet dispensing. Other DNA microarrays used pre-synthesized probes and dispensed them directly on the microarray surface using capillary pins or piezoelectric inkjet dispensers. Current gene expression microarrays have over six million probes. Microarrays have transcended DNA microarray applications to include chemical compound, antibody, peptide, protein, cellular, and tissue microarrays. In general microarrays are used to detect target molecules in a sample via binding to probe molecules immobilized on a surface. For example, antibody arrays detect antigens and reverse phase protein arrays detect antibodies in a sample. Individual binding events do not produce byproducts that have to be sealed in isolated compartments.

High throughput screening (HTS) involves screening large libraries of chemical compounds for binding affinity with protein targets that may have beneficial therapeutic effect. The chemical compounds identified in this process, known as 'hits', are further evaluated to profile cellular or biochemical pathways and evaluate efficacy as potential drug candidates. HTS is typically done in 96 or 384 well microplates. Ultra High Throughput Screening (uHTS) involves more than 100,000 assays per day and is usually done using 1536 well microplates. However microarrays are also used for HTS. If screening for protein binding affinity then chemical compounds can be covalently bound to a microarray surface similar to DNA microarrays. Other HTS microarray platforms have unbound chemical compounds on the microarray surface that are subjected to reagent in an aerosol spray. Still other HTS formats subject chemical compound microarrays to reagents in agarose gel that maintains an aqueous environment and inhibits diffusion.

Polymerase chain reaction PCR has become a ubiquitous laboratory tool with many applications including: gene expression profiling, genetic profiling, genotyping and DNA sequencing. Unlike DNA microarrays, PCR involves free floating intermediate molecules that must be contained during the assay. There are advantages to miniaturizing PCR for obvious reasons: higher throughput, reduced reagents, smaller instrumentation and smaller thermal mass for faster thermal cycling. However miniaturizing PCR poses technical challenges. As PCR volume decreases, amplification is increasingly prone to biochemical surface absorption problems due to the increasing surface-to-volume ratio. Due to the extremely sensitive nature of the PCR, minute amounts of nucleic acid contamination in PCR chips can result in a false positive PCR outcome. An important drawback of PCR chip microsystems is the generation of air bubbles which not only cause large temperature difference in the sample but can also expel sample from the PCR chamber. Evaporation is also an issue for smaller volumes. The systems described herein address issues associated with PCR in small reaction volumes. Additives to the PCR reaction mixture, such as BSA, are essential for amplification in glass based reaction vessels.

The first integrated micromachined devices were developed for performing PCR reactions in small ~25 µl, reaction volumes. Such integrated miniature 'lab-on-a-chip' devices were also known as micro total analysis systems (pTAS), micro electrical mechanical systems (MEMS) or microreactors. Initially arrays of micro-reactors (microreactors) were manufactured from PDMS silicone rubber and enclosed using a cover slip to prevent evaporation. In addition, a 'discontinuous dewetting' approach was used to fill the microreactors with reagent, which involved submerging the array of microreactors in reagent and pulling it out vertically. It was found that reagent remains trapped in the microreactors if the receding contact angle between the reagent and surface of the array was between ~16 to ~81 degrees. Such approach did not take into consideration how the microreactors were initially filled (wetted) with reagent in the bulk fluid without entrapping air pockets.

The concept of 'digital PCR' was also introduced, whereby PCR reactions take place in small reaction chambers initially having either zero or several template DNA sample molecules. After thermal cycling, the total number of template DNA in the original sample was quantified by counting the number of reaction chambers with amplified DNA signal. Reaction chambers with DNA sample and PCR reaction mixture were filled by means of capillary action into hydrophilic chambers, which were subsequently sealed with an immiscible displacing fluid that flowed through the same channels as the original DNA sample and PCR reaction mixture. One group performed polymerase chain reactions (PCR) in 'microchamber' arrays, which were isotropically etched in silicon and ranged in size from 1.3 pl to 32 nl. Template DNA (pGFP) absorbed to glass beads was dispensed into the microchambers via a glass pipette. A HIPORA membrane was placed over the microchamber array, which is similar to GoreTex in that it allows vapor to pass but is impenetrable to liquid. A cover slip was placed over the membrane and sealed with varnish. The cover slip was removed after thermal cycling. The HIPORA membrane allowed drying of the microchambers without cross talk. The lower volume limit for detecting PCR product in these silicon microchambers was 85 pl. Another group continued that work by performing PCR in microchambers with improved methods for filling and sealing. They worked with 40 nl microchambers etched in silicon. They covered arrays of microchambers with layers of oil and dispensed a PCR mixture through the oil using a microliter dispensing system. After thermal cycling, amplified DNA was labeled with fluorescent dye and detected with a fluorescent microscope. However, recovery of PCR product from the microchambers proved to be problematic.

To overcome this limitation, the platform was extended using beads to capture DNA, which could be recovered after amplification. Template DNA was pre-annealed to the beads prior to loading them onto a 'PicoTiterPlate,' which consisted of more than 300,000 microchambers. The microchambers were sealed with a silicone rubber sheet and solid support prior to thermal cycling. PCR product was detected directly in microreactors using fluorescently labeled probes. This system eventually evolved into 454 sequencing technology which also used DNA capture beads and the PicoTiterPlate. However, in 454 sequencing, PCR thermal cycling was done using beads in oil emulsion which were then confined in microchambers using packing beads. As such, 454 sequencing combined three types of parallel assay platforms: microarrays, beads and emulsions. Studies regarding the filling of small reaction chambers with PCR reagent indicated that chamber surface-wetting properties, i.e. hydrophobic vs. hydrophilic, appeared more critical than chamber geometry to prevent air bubbles during filling.

Subsequently, a high density PCR platform was developed based on a 'microplate' consisting of thin (0.3 mm)

microscope slide (25 mm×75 mm) sized stainless steel sheet with 3072 individual 33 nl through holes that were functionalized with PEG to be hydrophilic on the inside. The stainless steel flat surface was functionalized with a fluoroalkyl layer to be hydrophobic. Differential hydrophilic-hydrophobic surface energies drove liquid into the through holes and prevented cross contamination between neighboring holes. A pin spotter loaded primers into the holes and an automated pipette loaded the sample. Through holes were sealed with an immiscible liquid prior to thermal cycling. This technology was commercialized as the 'OpenArray' system by BioTrove, acquired by Life Technologies as QuantStudio 12K Flex Real-Time PCR System. Also, Life Technologies provided the QuantStudio 3d digital PCR system consisting of a 3 mm×3 mm array of 20,000 individual 865 pl reaction chambers. DNA sample and PCR reaction mixture were squeegeed onto the surface of an array. Individual reaction chambers were sealed with immersion liquid encased in a plastic enclosure prior to thermal cycling. The system amplified the DNA for a single sample per array.

In addition the SmartChip Real-Time PCR System was developed, capable of performing 5184 gene PCR reactions per SmartChip in 100 μl reaction chambers. Primers were preloaded into the reaction chambers and samples were loaded onto the SmartChip using the SmartChip Multisample Microdispener system. More than one sample at a time could be analyzed on the SmartChip. One group developed the SlipChip to carry out multiplexed chemical reactions in isolated chambers that were on opposing plates. The chambers were pre-filled with reagents and then lined up with each other to start the reactions. Another group developed a method of vacuum assisted loading of a two-dimensional matrix of microreactors with subsequent sealing with PDMS.

In addition to PCR, microreaction chamber-based assay platforms have been developed for other applications in the life sciences. For example, a flow-through microfluidic channel 'PicoArray' system implemented light directed in situ synthesis of oligonucleotides or polypeptides based on the 'uParlo' system, which included 3698 individual 270 pl flow-through reaction chambers. Microliter-sized reaction chambers arrays were manufactured for multiplexed studies of antibiotics. Reaction chambers were hundreds of microns across, manufactured from SU8 and filled using inkjet printing. One flow-through microreactor biochip was used for detecting molecules in solution through receptor/ligand binding or hybridization. The biochip consisted of a microscope slide sized plate with regularly spaced through holes. A microporous membrane was bonded to one side of the plate forming an array of microreactors. The bottom of each microreactor was functionalized with a cross-linked hydrogel polymer probe to bind to a specific ligand or nucleic acid. The microreactors were not sealed, but rather binding reactions were to take place in a high humidity chamber to prevent evaporation. Biological samples were delivered to the microreactors by applying a vacuum through the microporous membrane. Similarly, washing solutions were pulled through the membrane.

Another group developed a microarray comprised of multiple micro compartments, 50-150 μm diameter. Samples were delivered by touching off with a capillary at higher pressure than the micro compartments. The microarray included a 'snap chip' assembly whereby reagents, within micro compartments, on a microarray chip were transferred to reagents on second microarray chip by holding them close together. A method of sealing microreactors was also disclosed by applying photocurable adhesive around the periphery of the microreactors and exposing the adhesive with light through a mask. Using electrochemical etching, textured porous surfaces were formed on silicon substrates. By varying etching parameters and surface chemistry surface wetting conditions were modified from hydrophilic to super hydrophobic. 'Microvials' with porous surfaces were formed in silicon and protein solutions were delivered into the microvials using a piezoelectric inkjet dispenser. Protein precipitated out of solution as the drops evaporated in preparation for Matrix assisted laser desorption/ionization, time of flight mass spectrometry (MALDI-TOF-MS).

Personalized medicine involves screening interactions of thousands of different proteins with serum samples to identify new biomarkers for cancer and other diseases. Eventually these biomarkers are used in clinics for early disease diagnosis. For example, a nucleic acid programmable protein array (NAPPA) platform was used to express thousands of unique proteins, from plasmid DNA, on glass microscope slides. Density of the NAPPA platform was increased using an array of nanowells that were sealed with silicone rubber. In vitro protein synthesis was performed in microchamber arrays fabricated using hydrophobic PDMS on hydrophilic glass surfaces. Chips ranged in size from 10,000 (150 pl) to 250,000 (1 and 5 pl) microchambers per chip. DNA immobilized beads and cell-free in vitro translation transcription (IVTT) reagent were added to the microchambers. Excess reagent was scraped away and the microchambers were sealed with glass cover slips. Green Fluorescent Protein (GFP) was successfully expressed and detected in the microchambers. For example, cell-free protein expression was performed in single 19 pl reaction chambers fabricated from silicon wafers.

Chamber size dependency was investigated for protein synthesis, with constant copy number DNA, in glass microchambers ranging in size from 56 fl to 350 fl. Cell-free protein synthesis was demonstrated using an array of ~70 μm picoliter chambers in PDMS bonded to glass. DNA was distributed to the picoliter chambers using beads. In vitro translation transcription (IVTT) reagent was dripped into the chambers, excess was removed and the chambers were sealed with a glass cover-slip to prevent evaporation and diffusion between chambers. One group demonstrated cell-free protein synthesis in microreactor arrays formed in PDMS sealed with a temperature controlled glass cover. Another group developed DNA array to protein array (DAPA) that consisted of a sandwich with a DNA microarray on one side, an IVTT coated membrane in the middle and a surface functionalized with capture antibodies on the other side. Proteins were expressed from the DNA microarray in the membrane and then captured on the functionalized surface. Yet another group developed the multiple spotting technique (MIST) for in situ protein microarray expression. A DNA microarray was spotted on a surface that was pre-coated with capture antibody and IVTT reagent was spotted on top of the DNA. Protein microarrays were expressed after rehydration and incubation.

In addition, bead-based assays first developed in the early 1980's were used to detect target molecules in solution using small, micron sized beads functionalized to bind specific molecules. The beads were uniquely labeled so that more than one type of molecule, in a given sample, was detected and identified at the same time. The beads and labeled molecules were typically detected by a flow cytometer one at a time in a continuous stream of small droplets. Bead based assays were sensitive down to single molecule detection. To detect low-abundance proteins in blood, they were captured on microscopic beads decorated with specific antibodies and then labeled the immunocomplexes (one or zero labeled target protein molecules per bead) with an enzymatic reporter capable of generating a fluorescent product. After isolating the beads in 50 fl reaction chambers designed to hold only a single bead, fluorescence imaging was used to detect single protein molecules. Arrays were 2 mm wide and included approximately 50,000 wells, each with a diameter of 4.5 µm and a depth of 3.25 µm. After sealing the loaded arrays against a rubber gasket in the presence of a droplet of fluorogenic enzyme substrate, each bead was isolated in a femtoliter volume reaction chamber.

In addition, ELISA, a popular format of "wet-lab" analytic biochemistry assay was extended to include a bead-based assay for single molecule detection. Hydrophilic wells were used, and filled in a gap with aqueous solution containing beads. They were then flooded with oil to displace water on the hydrophobic parts and water remained in hydrophilic parts. The oil sealed the individual wells. For example, Luminex xMAP was a commercial bead-based assay that used 5.6 µm polystyrene microspheres functionalized with probes for various assays, such as protein expression profiling, focused gene expression profiling, and molecular testing of disease. The beads were labeled with up to 500 different dyes and then detected using flow cytometry. Illumina has developed a platform that combines bead-based and microarray formats, where 3 µm silica beads were functionalized with probes depending on the application: sequencing, genotyping, gene expression profiling, PCR and so on. After processing the beads, they were randomly self-assembled onto an array of microreactors. The beads were decoded by hybridizing fluorescently labeled DNA oligonucleotides to the beads.

More recent high throughput assays were based on emulsions of picoliter droplets in oil. These systems were commercialized by BioRad, RainDance Technologies and others. Applications for emulsion systems include digital PCR and next generation DNA sequencing. In addition, cell culture assays were traditionally performed in Petri dishes or cell culture treated microplates. Many higher density formats were being developed for siRNA knockdown screens and other high throughput cell based functional genomic assays.

Therefore, given the above, there is a need for systems and methods for controlling micro-reactions in high throughput parallel assays.

SUMMARY

The present disclosure overcomes the drawbacks of previous technologies by providing a platform and method directed to, in certain embodiments, high-throughput parallel assays configured for controlling micro-reactions.

In accordance with one aspect of the present disclosure, a microreactor array platform is provided. The microreactor array platform includes an array of microreactors; a sealing film having a first surface and an opposite second surface, the sealing film configured to movably seal the array of microreactors; a reagent gap providing a fluid path between the array of microreactors and the second surface of the sealing film when the second surface of the sealing film is in spaced relationship with the array of microreactors; an injector for delivering a reagent into the reagent gap; and an applicator for directing a sealing liquid against the first surface of the sealing film. Here 'reagent' refers to any substance that participates in a chemical reaction as a reactant, catalyst, analyte or buffer for example. The microreactor array platform enables rapidly filling the microreactors with reagent and then sealing them into independent chemical reaction containers. An O-ring may seal along the sides of the microreactor array.

The microreactor array platform may include a system for creating a pressure differential between the reagent in the injector and the reagent gap. The system assists injecting reagent into the reagent gap by setting up a pressure differential between the reagent inside of the injector and the array of microreactors. The reagent injector may be a syringe, vial, tube, pipette, valve, solenoid valve or some other means of delivering small quantities of fluid. If a vacuum is applied to the reagent gap prior to injecting reagent, then atmospheric pressure may be sufficient to inject the reagent into the gap. For example, reagent may be injected into the array of microreactors by applying vacuum to the reagent gap and then opening a solenoid valve to allow reagent, at atmospheric pressure, to flow into the reagent gap.

The sealing film may be flexible. The sealing film may be impervious to fluids, providing a separation between the reagent and the sealing liquid. The sealing film is preferably strong to withstand high pressures yet thin and compliant to conform to and seal the microreactors. The sealing film is preferably smooth, without any wrinkles or creases that may trap reagent. The sealing film preferably deforms smoothly into the reagent gap when displacing the reagent and sealing the microreactors. The sealing film is preferably stiff laterally so that it lies flat, without wrinkles, prior to filling the reagent gap with reagent. The sealing film is preferably stiff laterally to enable printing functionalizing chemical spots onto the sealing film. The sealing film is preferably transparent so that the microreactor array surface can be seen through the window and sealing film. To help fill the microreactors with reagent, the sealing film may be more hydrophobic than at least a portion of a surface defining the array of microreactors. The microreactors may optionally be part of the flexible sealing film that comes into contact with a flat surface.

At least one of the microreactors may include functionalizing chemicals dispersed thereon. At least a portion of the opposing flat surface that comes in contact with the microreactors may include functionalizing chemicals dispersed thereon. Functionalizing chemicals may be coated onto large areas of the opposing flat surface or the microreactor array surface or dispensed in an array of spots. Alternatively (or additionally), functionalizing chemicals may be synthesized inside the microreactors or on the opposing flat surface. A larger individual functionalizing chemical spot may optionally span multiple smaller microreactors so that precise targeting of microreactors is not necessary when dispensing functionalizing chemical spots onto the microreactor array. Functionalizing chemicals may initiate chemical reactions or react with products of chemical reactions or with chemicals in the reagent. The initiating and reacting functionalizing chemicals may both be arrayed separately onto the microreactor array surface or opposing flat surface and then aligned with each other enabling multiplexed combinatorial chemical reactions. Alternatively (or additionally), initiating and reacting functionalizing chemicals may be collocated either in the microreactors or the opposing flat surface.

The functionalizing chemicals may be immobilized only temporarily, for at least as long as it takes to fill the microreactors with reagent and then seal them. If functionalizing chemicals are arrayed onto a flat flexible sealing film then they may be temporarily immobilized by overlaying them with a thin sheet of soluble material. Temporary immobilization may be achieved via reversible chemical bonds, photo-cleavable linkers, magnetic beads, soluble coating or other means. A soluble coating may be applied via non-contact dispensing or aerosol spray for example. A soluble coating may be gelatin for example.

The microreactor array platform may include a window configured with one or more window inlet ports and one or more window outlet ports for flowing the sealing liquid. The sealing liquid inlet port(s) may be in the middle of the window or at either end. There may be sealing liquid outlet port(s) in the window opposing the sealing liquid inlet port. The sealing liquid inlet port(s) and outlet port(s) in the window may be used to flush out sealing liquid with other sealing liquids. For example, lower viscosity other sealing liquids or gases may allow the sealing film to be pulled up away from the microreactor array surface after the microreactors have been initially filled with reagent and sealed with sealing liquid. This may allow different reagents or gases to be cycled through the microreactor array platform to enable multi step chemical processing that may be automated.

The microreactor array platform may include a space between the window and microreactor array defining a gap for at least one of the reagent, the sealing film, or the sealing liquid. The thickness of this gap may be optionally set with shims on top and compliant layer beneath the microreactor array. The reagent may be forced into microreactors by applying vacuum to a thin reagent gap and then quickly injecting reagent, under higher relative pressure, into the reagent gap.

To prevent the sealing film from being pulled down onto the microreactor array surface in conjunction with vacuum applied to the reagent gap, vacuum may also be applied to the sealing liquid inlet or outlet port(s) to maintain at least a portion of the reagent gap open. Alternatively (or additionally), if the sealing film is pulled down, then reagent pushes the sealing film out of its way as it fills the reagent gap. A check valve or burst valve in the sealing liquid inlet port, with cracking pressure greater than one atmosphere, may prevent sealing liquid from flowing against the sealing film first surface when vacuum is applied to the reagent gap through the reagent outlet port. A burst valve may be implemented in the sealing liquid inlet port with a plug of material, like beeswax. In this case, the opening beneath the plug of material, of the sealing liquid inlet port, should be bigger than the plug to allow the plug to break free without impeding flow of sealing liquid against the first surface of the sealing film. Alternatively a burst valve may be implemented with thin impervious material that ruptures when pressure is applied to the sealing liquid.

The microreactor array platform may include a base configured with a base inlet port and a base outlet port for injecting or removing the reagent.

A vacuum may be applied to the reagent gap using the system via at least one of the base outlet port and base inlet port. Valves in the reagent inlet port and outlet port maintain vacuum until reagent is injected into the reagent gap. The reagent inlet port may have a check valve, with cracking pressure greater than one atmosphere, to prevent reagent from leaking into the reagent gap when vacuum is applied through the reagent outlet port. Alternatively (or additionally), a burst valve at the reagent inlet port may be used. Pressurized reagent may open the check valve or break the burst valve allowing reagent to flow freely into the reagent gap with minimal resistance. A hydrophobic restriction valve at the reagent outlet port may prevent vacuum from sucking reagent from the reagent gap after filling the microreactors. Alternatively (or additionally), a check valve at the reagent outlet port may be used. Alternatively (or additionally), the inlet port and outlet port may have actuated 3-way valves synchronized to switch from vacuum to reagent during injection of reagent.

The sealing liquid may be injected against the first surface of the sealing film via a pressure differential generated by the system. After filling the reagent gap with reagent, pressure applied to the sealing liquid may force it out against the sealing film first surface through a valve in the sealing liquid inlet port of the window. As the sealing liquid pushes and spreads out against the sealing film, it displaces excess reagent away from the top microreactor array surface and pushes it out through the reagent inlet or outlet ports. The outlet port(s) of the window are advantageously kept opened as the sealing liquid spreads against the first surface of the sealing film to vent gas and prevent gas pressure buildup against the first surface of the sealing film and thus prematurely sealing the microreactors before the sealing liquid has a chance to displace the reagent away from the surface of the microreactor array. The outlet port(s) of the window are advantageously closed once the sealing liquid has spread out against the first surface of the sealing film to apply and maintain a constant sealing liquid pressure through the sealing film onto the microreactor array surface for the duration of the chemical reaction assay. Excess reagent displaced from the microreactor array surface may be recovered from the reagent inlet or outlet ports.

The sealing liquid preferably has high viscosity to slowly wipe the reagent away from the microreactor array surface. A viscosity of the sealing liquid may be higher than the viscosity of the reagent it displaces. The sealing liquid may be incompressible. Incompressible, high viscosity sealing liquid is ideal for displacing reagent from the microreactor array surface as it slowly fills into the space between the window and the first surface of the sealing film. Using a constant pressure source to inject sealing liquid into the space between the window and the first surface of the sealing film produces a seamless transition from 1) displacing reagent to 2) sealing the microreactors.

A sealing liquid applicator may comprise one of a pneumatic source, a hydraulic source or a mechanical spring source. Constant pressure may be achieved via a pressure regulator, constant vapor pressure ($CO_2$ cartridge) or low mechanical spring rate. A constant pressure force extrudes the sealing liquid and then maintains a constant sealing pressure on the microreactor array surface. First and second surfaces of the sealing film may provide smooth, uniform flow paths for sealing liquid and reagent respectively The reagent injector and sealing liquid applicator may be actuated using automated control that may be incorporated into an automated chemical processing system that cycles various reagents or gases through the microreactor array platform. Automation may be based on using controls, solenoids, electronics, computers, software and so on.

The microreactor array platform may undergo thermal cycling. For thermal cycling, an automated microreactor array platform may have built-in heaters or coolers using thermoelectric devices or channels for hot or cold fluid. Alternately the entire microreactor array platform may be placed inside a chilling incubator or immersed in temperature controlled liquid baths for thermal cycling. The microreactor array platform may be cooled prior to injecting reagent to initially slow down the chemical reactions in the microreactors. Dry gas may have to be pumped into the reagent gap, under pressure, to prevent condensation if the microreactor array platform is cooled prior to injecting the reagent. The temperature of sealing liquids may be controlled, prior to injection, to control viscosity or provide thermal cycling of the microreactor array. The temperature of the whole microreactor array platform may be lowered to increase the viscosity of the sealing liquid prior to its injection against the first surface of the sealing film.

In accordance with another aspect of the present disclosure, a method for sealing a reagent in microreactors of an array of microreactors is provided. The method uses a microreactor array platform, comprising: (i) an array of microreactors, (ii) a sealing film having a first surface and an opposite second surface, the sealing film configured to movably seal the array of microreactors, (iii) a reagent gap providing a fluid path between the array of microreactors and the second surface of the sealing film when the second surface of the sealing film is in spaced relationship with the array of microreactors, and (iv) an injector for delivering a reagent into the reagent gap. The reagent is injected onto the array of microreactors using the injector; and an applicator directs a sealing liquid against the first surface of the sealing film to achieve a contact of at least a portion of the second surface with the array of microreactors. The microreactor array platform may further comprise a system for creating a pressure differential between the reagent in the injector and the reagent gap. A vacuum is applied to the reagent gap using the system via a pressure differential generated by the system.

The foregoing and other advantages of the disclosure will appear from the following description.

DETAILED DESCRIPTION

The present disclosure provides a microreactor array platform that enables simultaneous, multiple, parallel, high-density, independent, unique chemical reactions involving possibly free floating molecular compounds. Individual chemical reactions may thus be physically isolated in sealed containers, cavities, or chambers, preventing evaporation, diffusion or movement during an experiment. Chemical reactions in neighboring sealed containers, cavities, or chambers, therefore may not interfere with each other. As such, each sealed container, cavity, or chamber may contain unique molecular compounds that may undergo isolated chemical reactions without interference from neighboring containers, cavities, or chambers, or other external environments. In this manner, the microreactor array platform allows for any number of parallel reactions to take place at the same time, and under identical chemical and operating conditions, such as, for example concentration, volume, temperature, pressure and so on. Physical principles for design of the microreactor array platform are presented in the following paragraphs. These are followed by operational design principles for filling microreactors with reagent, displacing excess reagent and sealing the microreactors.

Good performance of a microreactor array platform may be characterized by complete filling and sealing of the microreactors. It is desirable that the microreactors be completely filled with reagent without entrapped air pockets and be sealed completely to prevent leakage for the duration of an experiment. Parameters of the microreactor array platform are very interdependent. For example, sealing liquid pressure required for effective sealing of the microreactors may depend on sealing film thickness.

Figure 1:
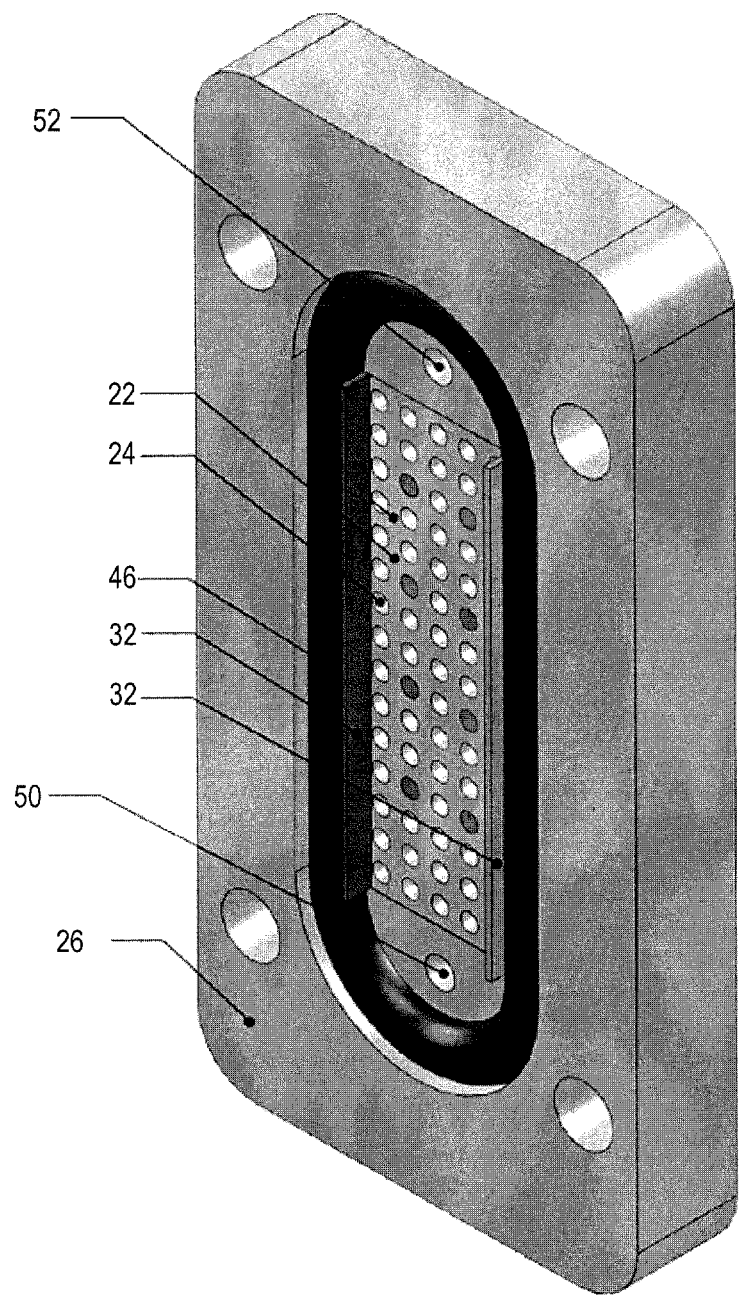
FIG. 1 is a schematic illustration showing an isometric view of an embodiment base of a microreactor array platform according to the present disclosure.

Turning now to the Figures, an embodiment of a microreactor array platform 20 includes a microreactor array 22 including a plurality of microreactors 24. The microreactor array 22 may be reversibly insertable into a housing or base 26. The base 26 may have a plate or slab-like configuration including a central cavity 26a for receiving the microreactor array 22 therein. In the illustrated embodiments, the microreactor array platform 20 is configured for filling microreactors 24 with one or more materials (e.g., fluids, buffers, samples, reagents, etc.) and sealing the microreactors 24 with a sealing film 28. Referring at least to FIG. 1, the microreactor array 22 may be fashioned from a single layer, which may be a flat rigid surface constructed using any appropriate material. The single layer may include an array of cavities, chambers, or microreactors 24 of any desired shape, size and depth, patterned into the upper surface 22a of the microreactor array 22. In some configurations, the microreactors 24 may also be constructed from a number of separate layers. For example, the microreactor array 22 may be formed from a first layer (e.g., a glass microscope slide) and a second layer arranged adjacent to the first layer, the second layer including an array of through holes of any desired shape and size.

In general, microreactor arrays may be manufactured from silicon wafers using standard silicon wafer fabrication processes from the semiconductor industry. Silicon wafers are readily available, relatively inexpensive and have precise thickness tolerance and consistent material properties. Silicon surfaces can be oxidized with a thin silicon dioxide ($SiO_2$) layer to be compatible with conventional glass surface chemistry and to prevent fluorescent signal quenching of bare silicon. Microreactor arrays manufactured from silicon may be reused by stripping off the $SiO_2$ layer and re-oxidizing the surface. The $SiO_2$ layer may be selectively patterned on the surface to provide areas of fluorescent quenching vs. non-quenching. Similarly, the surface of the microreactor array may be patterned to be more hydrophobic than the inside of the microreactors. Silicon has good thermal conductivity which assists speed and uniformity of thermal cycling. Microreactor arrays may also be manufactured from other materials such as glass, polydimethylsiloxane (PDMS) and so on.

Microreactor arrays that are the same dimensions as microscope slides, for example, 25 mm×75 mm×1 mm (1"×3"×0.04"), may be used in standard microarray scanners. Depending on the type of microarray scanner, bare reflective areas may have to be provided on the two ends of microreactor array surface to enable autofocus. Focus depth may be adjusted for the depth of the microreactors. In one aspect, it may be useful to manufacture the microreactor array 22 to precise mechanical tolerances so that the microreactor array 22 fits into the base 26 of the microreactor array platform 20. Further, when positioned within the base 26, the microreactor array 22 may define a reagent gap 30 having a precise thickness as shown at least in FIG. 5. Alternatively (or additionally), one or more shims 32 positioned to extend outwards from an upper surface 22a of the microreactor array 22, a compliant layer 34 positioned beneath the microreactor array 22, or a combination thereof may be provided to define a precise reagent gap 30. Accordingly, the base 26 may be sized to accommodate one or more of the shims 32 adjacent the sides 22b of the microreactor array 22 in the cavity 26a of the base 26. Further, the base 26 may be sized to accommodate a compliant layer 34 beneath at least a portion of the microreactor array 22.

Microreactors 24 in a microreactor array 22 may be distributed in any desired pattern and may include any number of microreactors 24. For example, a hexagonal pattern may fit more circular microreactors for the same pitch and area compared to rectangular patterns. Each microreactor 24 may be identified by a row and or column location in the microreactor array 22. Also, hexagonal patterns may help during filling of the microreactors 24 by breaking up the flow of reagent as opposed to rectangular patterns that allow flow of reagent along straight fluid paths between columns of microreactors 24.

The size, shape and depth of the microreactors 24 may affect functionalizing, filling, sealing and results of chemical reactions. Wider microreactors may be easier to target during an initial filling with functionalizing chemicals, for example, using inkjet printing. Also, wider microreactors may have thinner borders which may help with filling with reagent, since there is smaller surface area to channel flow around each microreactor. Thinner borders also help with sealing by increasing sealing pressure for the same applied force. For example, in a hexagonal array pattern, hexagonal microreactors may help with functionalizing, filling and sealing, since they have consistent border thicknesses compared to circular microreactors. In addition, depth to width ratio (aspect ratio) of the microreactors may also be important for filling. For example, an aspect ratio less than 1, corresponding to a shallow microreactor, may be advantageous in filling microreactors without entrapping air pockets. In particular, this may be applicable when initially filling individual microreactors with any functionalizing chemicals and subsequently filling them with reagent. Bigger microreactors have proportionally greater volume to surface-area than smaller ones. This may favor chemical reactions that are limited by the volume of the reagent. Conversely, smaller microreactors may favor chemical reactions that are limited by the amount of chemicals functionalized on their surfaces. Therefore, size factors may need to be accounted for when conventional chemical reactions are scaled down to microreactors. Relative concentrations of functionalizing chemicals and reagent may have to be adjusted accordingly.

In addition, microreactors with rounded corners may be easier to fill than microreactors with sharp or angular corners. This may be applicable for initial filling of microreactors with functionalizing chemicals, and subsequently with reagent. In particular, functionalizing chemicals tend to be pulled into sharp corners, resulting in non-uniform coating of microreactor surfaces. This may result in non-uniform wetting which may entrap air pockets when subsequently filling microreactors with reagent. Microreactors with uniformly hydrophilic (high wettability) surfaces may be easier to fill with functionalizing chemicals or reagent. Microreactor arrays with smooth top surfaces may also be easier to fill, with reagent, than ones with features that may obstruct the flow of reagent or direct it away from the microreactors.

Figure 4:
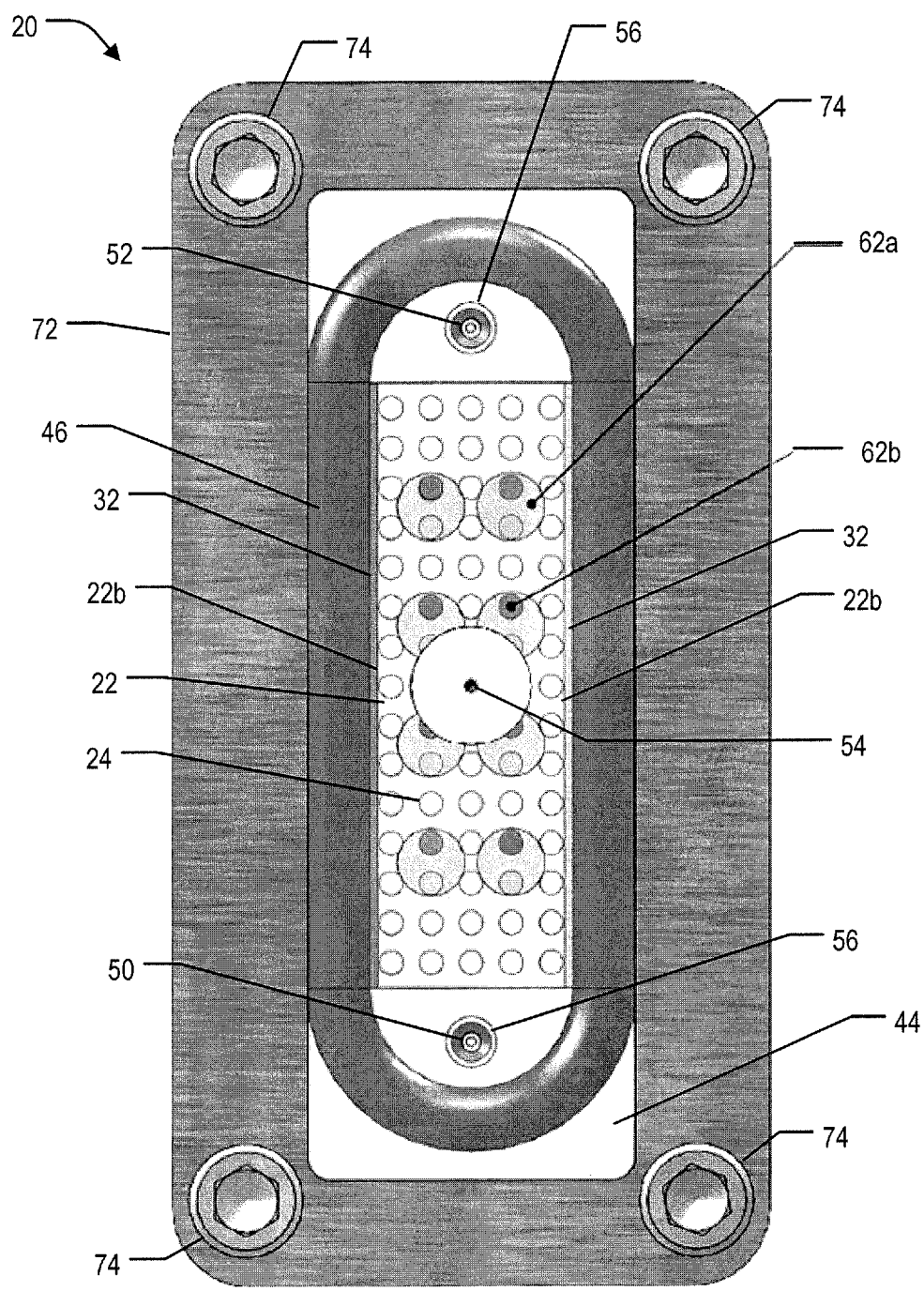
FIG. 4 is a top plan view similar to FIG. 3 showing an embodiment of a microreactor array platform with larger functionalizing-chemical spots spanning more than one smaller microreactor.
Figure 8:
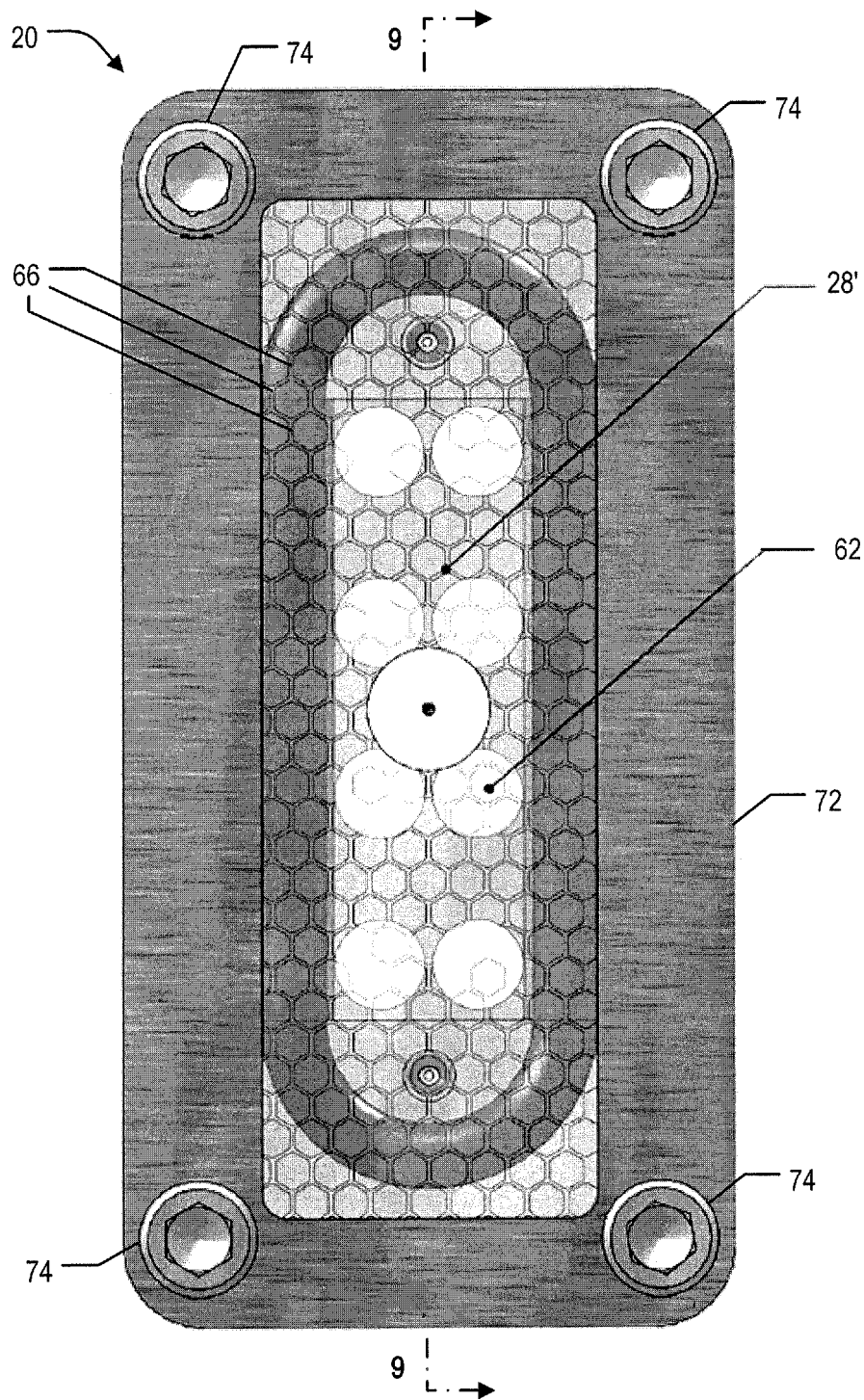
FIG. 8 is a top plan view of another embodiment of a microreactor array platform illustrating an array of microreactors patterned on the sealing film.
Figure 9:
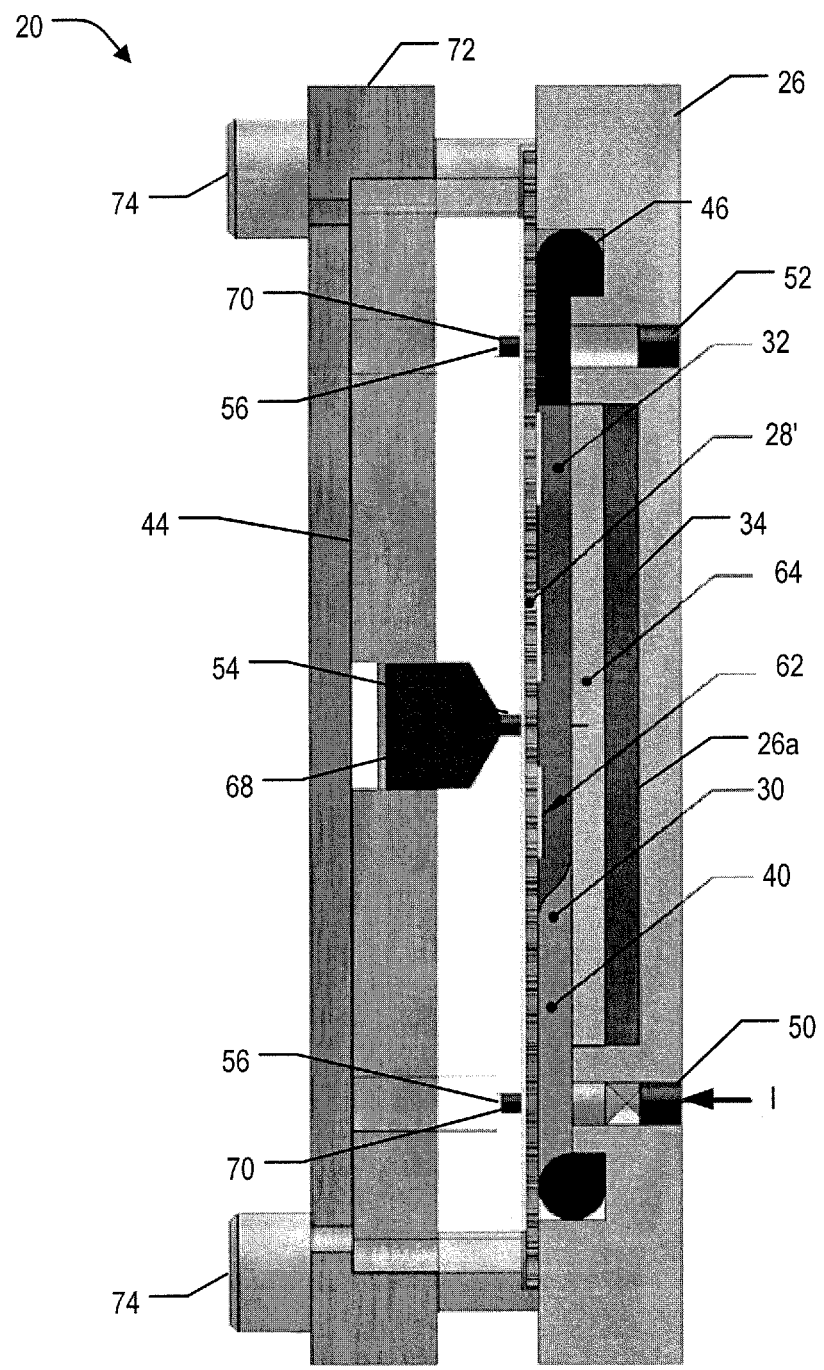
FIG. 9 is a cross-sectional view of the microreactor array platform of FIG. 8 as taken along the line 9-9.

As described, microreactors 24 in the microreactor array 22 may be functionalized with any number of functionalizing chemicals either prior to usage or during operation. These functionalizing chemicals may be distinctive with respect to any number of microreactors 24 and may be dispensed or dispersed along the upper surface 22a of the microreactor array 22 by any number of loading processes, such as pin spotting, inkjet printing or chemical synthesis process. Functionalizing chemicals may either initiate chemical reactions or react with products of chemical reactions. Initiating functionalizing chemicals may include any substances, such as PCR primers, that initiate chemical reactions to produce unique products, such as specific amplified DNA. Reacting functionalizing chemicals may include molecular probes that bind specific target molecules in a sample or bind the products of chemical reactions in microreactors 24. The upper surface 22a of the microreactor array 22 and the opposing flat surface (e.g., the second surface 36 of the sealing film 28) that it comes into contact may each be separately functionalized with a chemical spot 62 to initiate chemical reactions or react with products of those reactions respectively. The initiating chemical spots 62a and reacting chemical spots 62b may either be coated onto the entire sealing film 28 or on any surface of the microreactor array 22 (e.g., upper surface 22a, the side walls or bases of the microreactors 24, or the like) or arranged in an array of chemical spots 62. Initiating chemical spots 62a and reacting chemical spots 62b may both be arrayed separately onto the microreactor array 22 or the opposing flat surface (e.g., sealing film 28) and then aligned with each other thus enabling multiplexed combinatorial chemical reaction experiments. For example, the initiating chemical spots 62a may be dispensed about or embedded in the microreactors 24 prior to use. In this case, the opposing flat surface that comes into contact with the upper surface 22a of the microreactor array 22 may be functionalized separately to react with products of chemical reactions taking place in microreactors 24. Alternatively (or in addition), initiating chemical spots 62b may be dispensed or dispersed onto the opposing flat surface that comes into contact with the upper surface 22a of the microreactor array 22. In this case, any portion of the microreactor array 22 may be functionalized separately to react with products of chemical reactions taking place in microreactors 24. In some aspects, individual larger functionalizing chemical spots 62 may span multiple smaller microreactors 24 as shown at least in FIGS. 4 and 8, so that precise alignment of functionalizing chemical spots 62 with microreactors 24 may not be required when dispensing functionalizing chemicals into microreactors 24. Likewise, if functionalizing chemical spots 62 are arranged onto an opposing flat surface, precise alignment of the microreactor array 22 and opposing flat surface may not be required if larger functionalizing chemical spots 62 span multiple smaller microreactors 24.

The microreactor array platform 20 also includes a flexible sealing film 28 which is configured to provide a movable seal or cover for the array 22 of microreactors 24 by coming into contact with the microreactor array 22. In some embodiments, the microreactor array 22 is formed using an opposing flat surface 64 and an array of containers, cavities, or chambers 66 patterned on the sealing film 28. In one aspect, the opposing flat surface may be a glass microscope slide, a silicon wafer, or another suitable plastic, glass, metal, composite material, or like substrate.

In some embodiments, the sealing film 28 represents an important component of the microreactor array platform 20. During operation, the sealing film 28 may be placed in direct contact with contents of the microreactors 24. Further, the sealing film 28 may be designed to not interfere with chemical reactions taking place within the microreactors 24. Since the sealing film 28 may separate a sealing liquid 38 from a reagent 40, the sealing film 28 may be impenetrable to fluids, without holes or permeability to fluids. In one aspect, it may be useful to provide a sealing film 28 that is strong enough to withstand high sealing pressures yet be thin and compliant to conform to and seal the microreactors 24. Lower sealing pressures may be used with thinner sealing films 28. Note that arrows designated with a "P" in the Figures indicate the application of pressure. The sealing film 28 may deform smoothly into the reagent gap 30 when sealing the microreactors 24. The sealing film 28 may be inert to the chemicals with which it comes into contact. Also, the sealing film 28 may withstand temperature variations due to thermal cycling or exothermic chemical reactions, endothermic chemical reactions, or a combination thereof. In some embodiments, the sealing film 28 may be stiff laterally so that the sealing film 28 lies flat, without wrinkles, prior to filling with reagent 40. In other words, the sealing film 28 may be made from a rigid material like polyester instead of softer material like low density polyethylene (LDPE) or fluorinated ethylene propylene (FEP). A first surface 42 and the second surface 36 of the sealing film 28 may provide smooth, uniform flow paths for sealing liquid 38 and reagent 40 respectively. The sealing film 28 may be free of nicks, creases, wrinkles, gashes, holes, dust, dirt or other defects that may trap reagent 40 or otherwise cause improper localized sealing of the microreactors 24. The second surface 36 of the sealing film 28 may be uniformly less wettable (more hydrophobic) than the surfaces of the microreactor array 22 (more hydrophilic) to help fill the microreactors 24 with reagent 40. The sealing film 28 may be transparent so that the surfaces of the microreactor array 22 can be seen through a window 44 and sealing film 28.

All of the functionalizing chemicals, reagents or other materials in each of the microreactors 24 may interact with a single reagent 40, which may, for example, be a reagent that initiates chemical reactions or a sample containing different target molecules to be identified. The microreactor array platform 20 enables rapidly filling of the microreactors 24 with reagent 40 and then sealing them into independent chemical reaction containers (i.e., microreactors 24).

The microreactor array platform 20 includes an O-ring 46 to pneumatically or hydraulically seal the microreactor array 22 around its periphery. A transparent window 44 may allow observation of any filling processes. The bottom surface 48 of the window 44 provides a smooth consistent flow path for reagent 40 and sealing liquid 38. An inlet port 50 and an outlet port 52 are provided for the reagent 40. Further, an inlet port 54 and an outlet port 56 are provided for the sealing liquid 38. Inside diameters of the liquid paths of the ports (i.e., inlet port 50, outlet port 52, inlet port 54, and outlet port 56) may be larger than the reagent gap 30 so that liquid flow is not restricted by the ports. Liquid paths of the ports may be short to reduce dead-volume and flow resistance.

Microreactors 24 may be filled by forcing reagent 40 through a thin reagent gap 30 between the second surface 36 of the sealing film 28 and the microreactor array 22. For consistent, reliable filling of the microreactors 24, with minimal reagent volume, the thickness of the reagent gap 30 may be controlled. For example, the thickness of the reagent gap 30 may be controlled by tight dimensional tolerances of the microreactor array 22 and microreactor array platform 20. Likewise, the microreactor array platform 20 may be mechanically stiff to maintain a precise reagent gap 30 even under the stress of clamping the microreactor array platform 20 together. Mechanical stiffness and strength may also be required to withstand the stresses of a sealing liquid pressure and to prevent leaks. Stiffness of the microreactor array platform 20 may be achieved by a combination of stiff materials and thick base 26, top 72 and window 44. A precise reagent gap may also be achieved using shims 32 on the upper surface 22a of the microreactor array 22 along the edges as shown in FIG. 1. In this case, a compliant layer 34 may be placed underneath the microreactor array 22, and compressed when the microreactor array platform 20 is clamped together.

Experiments in the life sciences are typically carried out in aqueous solutions. Microreactors may be filled with aqueous reagents to initiate chemical reactions for experiments in the life sciences. Water has high surface tension which dominates other forces at small dimensions. For example, high surface tension causes air to become trapped in microreactors 24 if the microreactor array 22 is submerged in water. The same thing happens if water is poured on top of the microreactor array 22. Surface tension tends to keeps liquid surfaces smooth with minimal surface area. However, the surface of a reagent must be deformed into thousands of tiny bumps to conform to the indentations of microreactors to fill them with reagent. Reagent 40 is forced into microreactors 24 by applying vacuum to a thin reagent gap 30 and then quickly injecting reagent 40, under pressure, into the reagent gap 30. Note that arrows designated with a "V" in the Figures indicate the application of vacuum, while arrows designated with an "I" in the Figures indicate a point of injection. This approach overcomes surface tension through a combination of inertial, pressure, vacuum, wetting and viscous forces to force reagent into tiny microreactors 24. Reagent 40 may be injected into the inlet port 50 with a manual or automated syringe or pipette, imparting kinetic and potential energy to overcome the surface energy of the fluid. In some cases atmospheric pressure may be sufficient to reliably fill microreactors 24 with reagent 40. In this case, reagent 40 may be injected into the inlet port 50 through a solenoid valve or another type of valve. In general, a 'stronger' fluid in terms of pressure, density, incompressibility and viscosity pushes 'weaker' fluid out of its way. During filling, air remaining in microreactors 24 is displaced by an advancing wall of pressurized reagent 40. Similarly, after filling, excess reagent 40 is displaced from the upper surface 22a of the microreactor array 22 prior to sealing. This is done using an advancing wall of pressurized high viscosity sealing liquid 38 that displaces excess reagent 40 through the sealing film 28. Similar issues, concerning filling small features with fluids, come up in other fields such as plastic injection molding and microimprint lithography. Note that arrows designated with a "D" in the figures indicate the displacement of a fluid or other material.

Body (gravitational) forces may have little influence on filling microreactors 24. Bond number $$Bo = \frac{\rho a (d_h)^2}{\gamma}$$

characterizes the relative influence of body force $\rho a (d_h)^2$ vs. surface tension $\gamma$. Body force depends on density $\rho$, acceleration $a$, and hydraulic diameter $d_h$. For thin closed channels, $d_h$ is twice the thickness of the channel d. If Bo<1, then surface tension dominates body forces. A microreactor array platform 20 has low Bond number meaning that flow into microreactors 24 is dominated by surface tension vs. body forces. To fill microreactors 24 with liquid using body forces may require higher accelerations which may be achieved in a centrifuge. Microreactors 24 may also be filled by submerging them in liquid and degassing in vacuum. However, both of these approaches take time and chemical reactions may be well underway before the microreactor array 22 can be removed from the centrifuge or vacuum chamber and then sealed. Filling microreactors 24 by degassing in a vacuum chamber may require >5 minutes to pull air out of the microreactors 24 through the gas permeable layer of liquid on the upper surface 22a of the microreactor array 22. This process may be expedited by degassing the liquid prior to submerging a microreactor array or by heat or sonication while pulling vacuum.

Air needs to be advantageously displaced from the microreactors 24 to fill them completely with reagent 40. The advancing front of reagent 40 pushes air out of the microreactors 24 and out through the outlet port 52. Air pressure increases towards the outlet port 52 of the microreactor array 22 possibly resulting in incomplete filling of those microreactors 24. Applying a vacuum at the outlet port 52, prior to filling, helps mitigate this problem. The goal is to remove as much air from the microreactors 24 as possible prior to injecting reagent 40. The air mass $m_v$ in the microreactors 24 under vacuum $P_v$ compared to the mass $m_a$ at ambient pressure $P_a$ is $$\frac{m_v}{m_a} = \frac{P_v}{P_a}.$$

97% of the air is removed from the microreactors 24 by applying a vacuum of about 29 inches Hg (about 0.92 inches Hg absolute pressure). The advancing fill front of the reagent 40 displaces the remaining air in the microreactors 24. The difference between the positive pressure of the reagent 40 and the vacuum pressure in the microreactors 24 helps force reagent 40 into the microreactors 24. The inlet port 50 for the reagent 40 has a check valve 58 with cracking pressure greater than about 1 atmosphere to prevent reagent 40 from leaking into the reagent gap 30 when vacuum is applied. In some embodiments a burst valve may be substituted for or combined with the check valve 58 at the inlet port 50 to maintain vacuum before injecting the reagent 40. Pressure at the inlet port 50 may break the burst valve allowing reagent 40 to flow freely into the reagent gap 30 with minimal resistance. A hydrophobic restriction valve 60 at the outlet port 52 may prevent vacuum from sucking reagent 40 from the reagent gap 30 after filling the microreactors 24. In some embodiments, a check valve may be combined with or substituted for the hydrophobic restriction valve 60 at the outlet port 52 to maintain a vacuum in the reagent gap 30 before injecting reagent 40. In another aspect, the inlet port 50 and outlet port 52 may have actuated 3-way valves synchronized to switch from vacuum to reagent 40 during injection.

Reagent 40 is exposed to a large surface area when it is injected into the reagent gap 30. If vacuum is applied to the reagent gap 30 then gas dissolved in the reagent 40 may come out of solution when exposed to this vacuum. Therefore the reagent 40 may have to be degassed prior to injection to prevent gas bubbles forming in the reagent 40 during injection.

Weber number $$W_e = \frac{\rho d_h v^2}{\gamma}$$

characterizes relative influence of inertia vs. surface tension. It is used to analyze thin film flows and the formation of droplets and bubbles. The Weber number for a microreactor array platform is $W_e$>1 meaning that inertial forces have moderate influence on filling microreactors compared to surface tension. Weber number scales as the square of velocity v so it can be increased by injecting reagent 40 faster. However there is an upper limit to velocity for filling microreactors. At higher Weber numbers, reagent 40 may break up into droplets on the upper surface 22a of the microreactor array 22 due to inertial forces. This is exacerbated if gas is trapped or dissolved in the reagent 40.

Capillary number $$C_a = \frac{\mu v}{\gamma}$$

characterizes relative influence of viscous vs. surface tension forces. The microreactor array platform 20 may have low capillary number, meaning that liquid flow dynamics at velocity v are heavily influenced by surface tension $\gamma$ compared to viscosity $\mu$. One group investigated liquid filling dynamics of small features at low Capillary numbers $C_a$=0.001 to 0.01 for microimprint lithography applications. They identified the following conditions for complete filling of small features: high Capillary number, low aspect ratio features and high surface wetting properties. At high Capillary numbers, the dynamic contact angle becomes very largely dependent on global hydrodynamics of the flow and these permit filling microreactors at high speeds. High Capillary number is achieved by high flow velocity v, high viscosity μ or low surface tension γ. High flow velocity may come from an external pressure differential applied to the reagent 40. Relying on capillary action alone, without applying pressure, may result in incomplete filling of microreactors 24 since reagent 40 may flow slowly over the top of the upper surface 22a of the microreactor array 22 without going into the microreactors 24. Under certain circumstances, it may be possible to increase Capillary number by adding a thickening agent to the reagent 40 to increase viscosity. Similarly, Capillary number may be increased by decreasing surface tension with surfactant. Even small concentrations of surfactant <0.01% may decrease surface tension dramatically. Aspect ratio is relative depth to width ratio of microreactors 24. Generally, aspect ratios less than 1 are required for complete filling of microreactors 24. In other words, it may be useful to provide microreactors 24 that are wider than they are deep for complete filling. Surface wetting properties in the reagent gap 30 may also be important. A higher wetting (hydrophilic) surface of microreactor array 22 compared to the opposing surface (hydrophobic) promotes filling of the microreactors 24. Hydrophilic surfaces have lower contact angle compared to hydrophobic ones which pulls liquid into the microreactors 24. Consistent wetting properties across the surface of the microreactors 24 are also important to prevent entrapping localized air pockets. Uniformly pre-coating the surfaces of the microreactor array 22 with a hydrophilic reagent promotes uniform wetting and filling of microreactors 24.

Reynolds number $$R_e = \frac{\rho v d_h}{\mu}$$

characterizes relative influence of inertial vs. viscous forces. Physical design parameters are interdependent. In one aspect, it may be useful to balance physical design parameters to achieve proper filling of the microreactors. High reagent injection velocity increases Capillary number to help overcome surface tension with viscous forces. However, Weber number also increases with velocity, which may result in incomplete filling of microreactors due to inertial forces that may break up reagent flow. This may manifest as foaming and may be exacerbated by gas dissolved in the reagent. Inertia may also cause reagent to skim across the top of the microreactors instead of flowing down into them. Complete filling of microreactors may be assisted by a relatively low Weber number and a relatively high Capillary number. The ratio of Weber to Capillary numbers is also Reynolds number $$Re = \frac{W_e}{C_a}.$$

For complete filling of microreactors, it may be useful to provide a low Reynolds number. For example, regent flow in the fluid gap of the microreactor array platform may have a Reynolds number of about 20, thereby resulting in laminar flow. In one aspect, a low Reynolds number corresponds to low reagent injection velocity v, a high kinematic viscosity $$\frac{\mu}{\rho},$$

and a small reagent fluid gap d.

After filling the microreactors 24, excess reagent 40 is displaced from the upper surface 22a of the microreactor array 22 and each of the individual microreactors 24 is sealed to prevent evaporation, leakage, diffusion, movement or cross-contamination during an assay. Functionalizing chemicals may be immobilized to prevent dislodging by reagent 40 prior to sealing the microreactors 24. For example, functionalizing chemicals may be permanently immobilized by chemical bonds. Alternatively (or additionally), functionalizing chemicals may be immobilized only temporarily, for at least as long as it takes to fill and seal the microreactors 24 with reagent 40. After the microreactors 24 are filled with reagent 40 and sealed, the functionalizing chemicals may be released into the reagent 40 without diffusing into neighboring microreactors 24. Temporary immobilization may be achieved via reversible chemical bonds, photocleavable linkers, magnetic beads, soluble coatings, or the like. A soluble coating may be applied, for example, via non-contact dispensing or aerosol spray. In some configurations, the soluble coating could be gelatin. If functionalizing chemicals are arrayed onto a flat flexible sealing film 28, then they may be temporarily immobilized by overlaying them with a thin sheet of soluble material.

Excess reagent 40 may be displaced from the upper surface 22a of the microreactor array 22 after filling the microreactors 24 to ensure proper sealing. Trapped puddles of reagent 40 may impede complete sealing, thereby resulting in leaking, diffusion or cross-contamination of the contents of the microreactors 24. Therefore, it may be useful to configure the microreactor array platform 20 for displacing excess reagent 40. Some type of wiping, rolling or squeegee action may be implemented to displace excess reagent 40 from the upper surface 22a of the microreactor array 22. Pushing straight down on the microreactor array 22 with a compliant material may not displace the entire reagent 40 since puddles may become trapped on the upper surface 22a of the microreactor array 22. The puddles may not be displaced regardless of how hard the compliant material is pushed down. This is because the areas surrounding the puddles are sealed more tightly as the compliant material is pushed down, blocking the flow of reagent 40 away from the puddles. The incompressible liquid of a puddle is pushed further into the compliant material without being displaced from the upper surface 22a of the microreactor array 22. A rigid material may displace more reagent 40. However, some liquid is invariably trapped in valleys, caused by surface irregularities between the rigid material and the upper surface 22a of the microreactor array 22, resulting in poor sealing of microreactors 24.

In some embodiments, the microreactor array platform 20 displaces excess reagent 40 by forcing pressurized sealing liquid 38, through the inlet port 54 in the bottom of the window 44, against the first surface 42 of a sealing film 28. As the pressurized sealing liquid 38 spreads out against the first surface 42 of the sealing film 28, the sealing liquid 38 may displace reagent 40 through contact with the second surface 36 of the sealing film 28, from the upper surface 22a of the microreactor array 22. Excess reagent 40 is then pushed out through the inlet port 58 or outlet port 52. If desired, reagent 40 may then be recovered from the inlet port 58 or outlet port 52. The sealing film 28 may be impervious to liquids and may be smooth without any wrinkles or creases, which can trap reagent 40. In some embodiments, the sealing liquid 38 has a high viscosity to slowly wipe the reagent 40 away from the upper surface 22a of the microreactor array 22. The temperature of the sealing liquid 38 and the whole microreactor array platform 20 may be lowered to increase the viscosity of the sealing liquid 38 prior to injection against the first surface 42 of the sealing film 28. A constant sealing pressure force extrudes the high viscosity sealing liquid 38 and maintains a constant sealing pressure on the upper surface 22a of the microreactor array 22. Pressure is related to velocity of the sealing liquid via the Darcy-Weisbach equation $$\nabla p = f_D \frac{1}{d_h} \frac{\rho v^2}{2}$$

relating pressure drop $\nabla p$ to fluid velocity v and fluid density $\rho$ in a channel of length l and hydraulic diameter $d_h$. Parameter $f_D$ is the dimensionless Darcy friction factor which is $$f_D = \frac{64}{R_e}$$

for laminar flow where $R_e$ is the Reynolds number.

The flow path for sealing liquid 38 is preferably smooth for uniform velocity against the sealing film 28. The viscosity of the sealing liquid 38 is preferably higher than the viscosity of the reagent 40 being displaced. If gas or low viscosity sealing liquid 38 is used, then sealing liquid 38 velocity may be too high to displace reagent 40 from the upper surface 22a of the microreactor array 22. Low viscosity sealing liquid 38 or gas may quickly spread out against the first surface 42 of the sealing film 28 without wiping the reagent 40 completely away from the upper surface 22a of the microreactor array 22. Consequently a thin layer of reagent 40 may become trapped on the upper surface 22a of the microreactor array 22 and may not be displaced regardless of how high a sealing pressure is applied to the sealing liquid 38. This trapped layer may prevent complete sealing of the microreactors 24 resulting in localized leakage of the contents of the microreactors 24. The outlet ports 56 of the window 44 may be kept open as the sealing liquid 38 spreads against the first surface 42 of the sealing film 28 to vent gas and prevent gas pressure buildup against the first surface 42 of the sealing film 28, thereby prematurely sealing the microreactors 24 before the sealing liquid 38 has a chance to displace the reagent 40 away from the upper surface 22a of the microreactor array 22. The outlet ports 56 of the window 44 may be closed once the sealing liquid 38 spreads out against the first surface 42 of the sealing film 28 to apply and maintain a constant pressure of the sealing liquid 38 through the sealing film 28 onto the upper surface 22a of the microreactor array 22 for the duration of the chemical reaction assay.

The sealing film 28 may temporarily adhere to the bottom surface 48 of the window 44 without contact with the upper surface 22a of the microreactor array 22, if vacuum is applied to the reagent gap 30. In this case, the sealing film 28 may be adhered with a liquid adhesive that does not dry out. The sealing film 28 may then release smoothly when sealing liquid 38 is injected against first surface 42 of the sealing film 28.

Sealing liquid 38 need not flow against the first surface 42 of the sealing film 28 before injecting the reagent 40 since the sealing liquid 38 may cause the sealing film 28 to block the flow of the reagent 40. Applying vacuum to the reagent gap 30 may pull sealing liquid 38 against the first surface 42 of the sealing film 28. This may be prevented with a valve 68 in the inlet port 54. In one aspect, the valve 68 may be a check valve or burst valve having a cracking pressure greater than about 1 atmosphere. A burst valve may be implemented with a plug of material, such as beeswax, in the inlet port 54. In this case, the opening in the window 44 beneath the plug in the inlet port 54 may be greater than the plug to allow the plug to break free of the window 44 without impeding flow of sealing liquid 38. In another aspect, a burst valve may be implemented with thin impervious material that ruptures when pressure is applied to the sealing liquid 38. In another aspect, vacuum may be applied to the sealing liquid 38 while applying vacuum to the reagent gap 30 to balance out pressure forces on the sealing liquid 38. The sealing liquid 38 may be degassed before applying vacuum to prevent air bubble formation in the sealing liquid 38.

Figure 6:
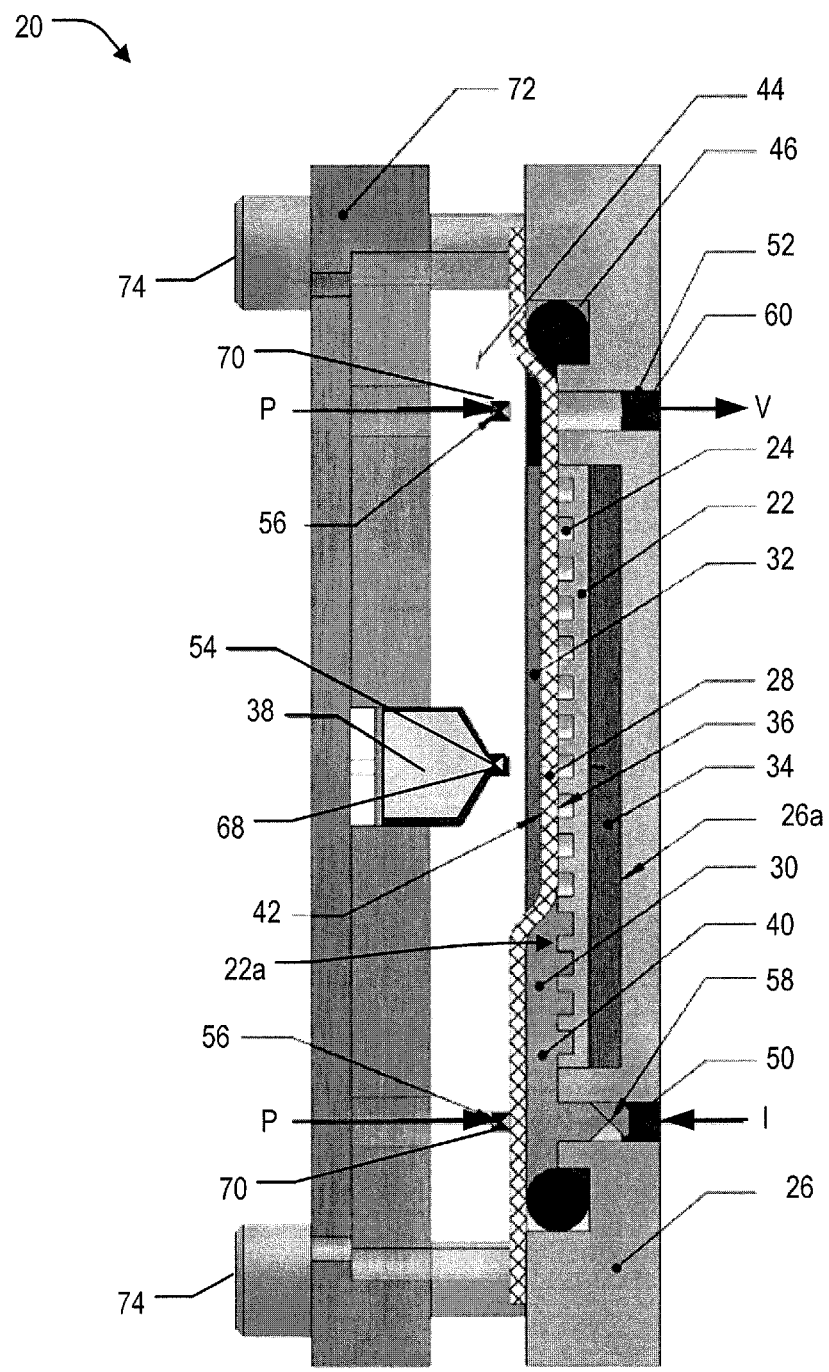
FIG. 6 is a cross-sectional view similar to FIG. 5 illustrating filling of the microreactors with reagent, wherein the sealing film second surface is initially touching the microreactor array surface.
Figure 7:
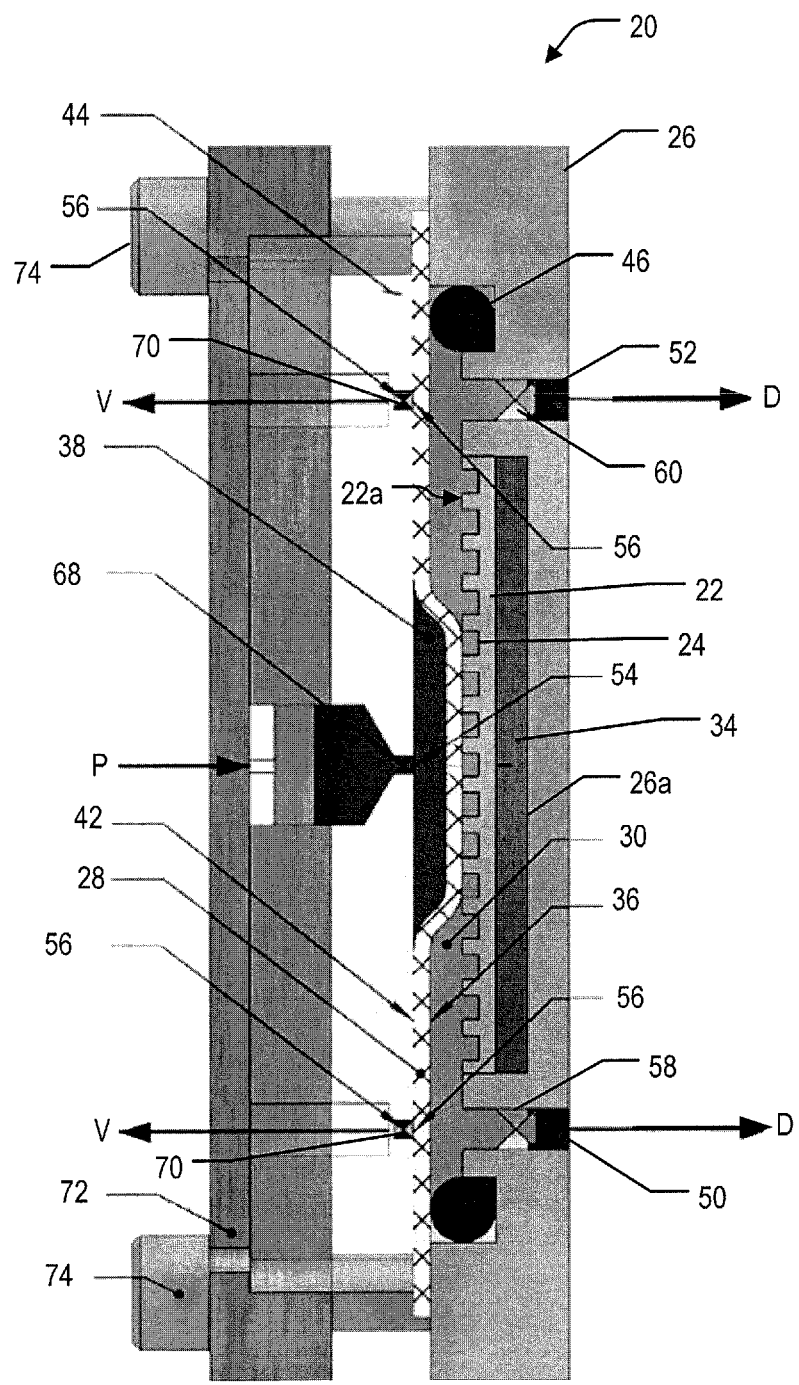
FIG. 7 is a cross-sectional view similar to FIG. 5 illustrating the displacement of reagent with sealing liquid and sealing of the microreactors.

The inlet port 54 may be in the middle of the window 44 as shown in FIG. 6, or at either end of the microreactor array platform 20. Further, outlet ports 56 are positioned to be generally opposing each of the inlet port 50 and outlet port 52. Further, inlet port 54 may be collocated with one of the outlet ports 56 so that there is one inlet port 54 and one outlet port 56 for the sealing liquid. If vacuum is applied to the reagent gap 30, prior to injecting reagent 40, then the sealing film 28 may be pulled down onto the upper surface 22a of the microreactor array 22. This may happen if the sealing film 28 is not adhered to the bottom of the window 44 or if inlet port 54 or outlet ports 56 are open to atmospheric or positive absolute pressure. If the sealing film 28 is pulled down, then the inertia of the sealing film 28 and air pressure above the sealing film 28 may help to fill the microreactors 24 as the advancing fill front of reagent 40 pushes the sealing film 28 away from the upper surface 22a of the microreactor array 22. This may impart an opposing force component towards the interior of the microreactors 24 helping to fill them completely with reagent 40. In another aspect, to prevent the sealing film 28 from being pulled down onto the upper surface 22a of the microreactor array 22, vacuum may be applied to inlet port 54 or outlet ports 56 in conjunction with vacuum applied to the reagent gap 30. This may balance out the pressure on the first surface 42 and the second surface 36 of the sealing film 28 so that the sealing film 28 is not pulled down onto the upper surface 22a of the microreactor array 22 prior to injecting reagent 40. In some embodiments, each of the outlet ports 56 may be provided with a suitable valve 70 to control the application of vacuum, the recovery of sealing liquid 38, or the like.

Outlet ports 56 may be used to flush out high viscosity sealing liquid 38 with another material. The temperature of the sealing liquid 28 or other material may be controlled, prior to injection, to control viscosity or provide thermal cycling or temperature regulation of the microreactor array 22. Lower viscosity sealing liquids or gasses may allow the sealing film 28 to be pulled up away from the upper surface 22a of the microreactor array 22. This may allow different reagents or gasses to be cycled through the reagent gap 30. This feature may be incorporated into an automated chemical processing system that cycles various reagents or gases through the microreactor array platform 20. For thermal cycling, embodiments of an automated microreactor array platform 20 may have built-in heaters or coolers using, for example, thermoelectric devices or channels for hot or cold liquid. In other embodiments, the entire microreactor array platform 20 may be placed inside a chilling incubator or immersed in a temperature controlled liquid bath for thermal cycling or temperature regulation in general. The microreactor array platform 20 may be cooled prior to injecting reagent 40 to initially slow down the chemical reactions in the microreactors 24 or to increase the viscosity of the sealing liquid 28. Dry gas may be pumped into the reagent gap 30 under pressure to prevent condensation if the microreactor array platform 20 is cooled prior to injecting the reagent 40.

Pressurized sealing liquid 38 may press down on the sealing film 28 to seal all of the microreactors 24. To provide a good seal, the sealing pressure may be high enough so that the sealing film 28 conforms to the inner perimeters of the microreactors 24. Applying sealing pressure to the sealing film 28 with a sealing liquid 38 may be useful for this application. Liquid may flow freely and conform to the shape of its container. Therefore liquid may be used to apply uniform sealing pressure across the sealing film 28. By contrast, a solid material such as silicone rubber may provide uneven sealing pressure due to variations in thickness or defects in the material. Therefore, reagent may become trapped in the imperfections resulting in poor sealing and leakage in those areas. Incompressible, high viscosity sealing liquid 38 may be useful for displacing reagent 40 out of the way as the sealing liquid 38 fills the space between the window 44 and the first surface 42 of the sealing film 28. By comparison, gasses are compressible and have low viscosity. Accordingly, gasses may not displace reagent from the upper surface 22a of the microreactor array 22. Using a constant pressure source to inject sealing liquid 38 against the first surface 42 of the sealing film 28 may produce a seamless transition from 1) displacing reagent 40 to 2) sealing the microreactors 24. The sealing pressure source may be pneumatic, hydraulic or a mechanical spring, for example. Constant sealing pressure may be achieved via a pressure regulator, constant vapor pressure ($CO_2$ cartridge) or low mechanical spring rate, for example.

For some applications, chemical reactions may undergo thermal cycling. The microreactors 24 may remain sealed as the reagent 40 within the microreactors 24 expands or contracts. Expansion and contraction may be exacerbated if gas is entrapped or dissolved in the reagent 40 especially if bubbles form at higher temperatures. Solubility of gas in liquid increases with pressure. Similarly boiling temperature increases with pressure. Therefore applying sealing pressure may prevent bubble formation in the microreactors 24 during thermal cycling. Degassing the reagent 40 prior to thermal cycling may also be useful. Adding substance such as glycerol or polyethylene glycol, with a boiling point above about 100° C., may increase the boiling point of the reagent 40; thereby further reducing bubble formation at higher temperatures.

Figure 2:
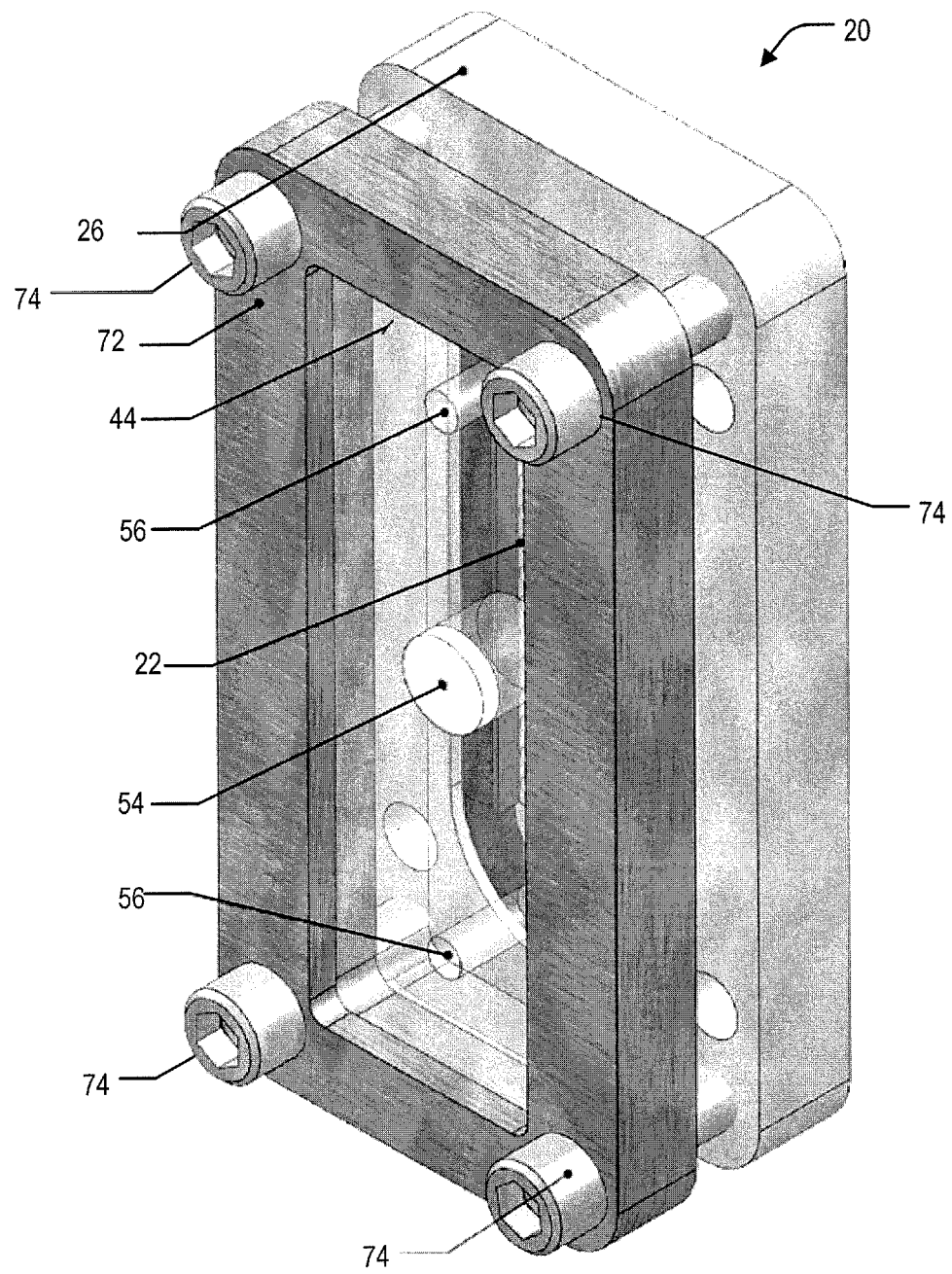
FIG. 2 is a schematic illustration showing an isometric view of an embodiment of a microreactor array platform according to the present disclosure.
Figure 3:
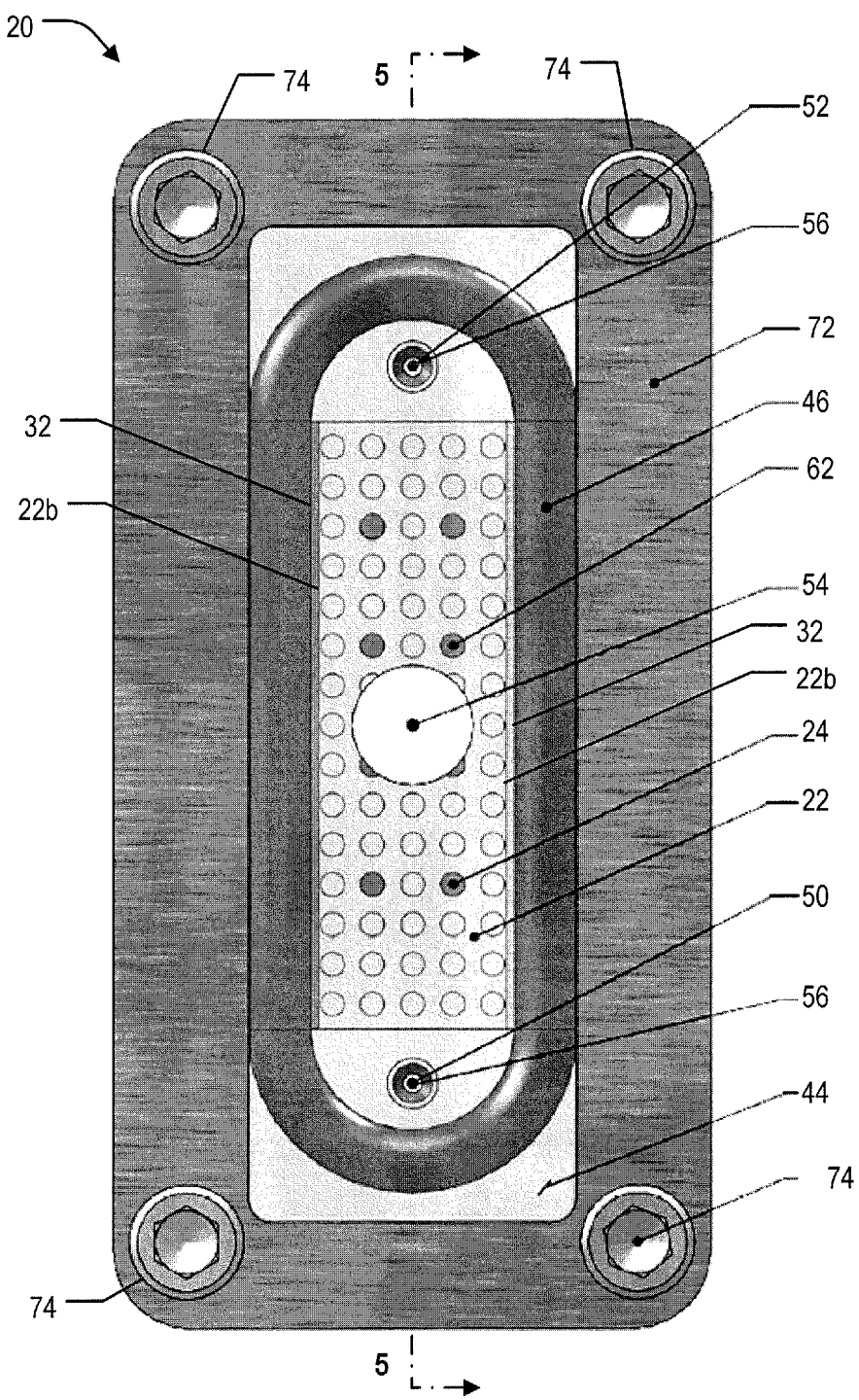
FIG. 3 is a top plan view of the microreactor array platform of FIG. 2.
Figure 5:
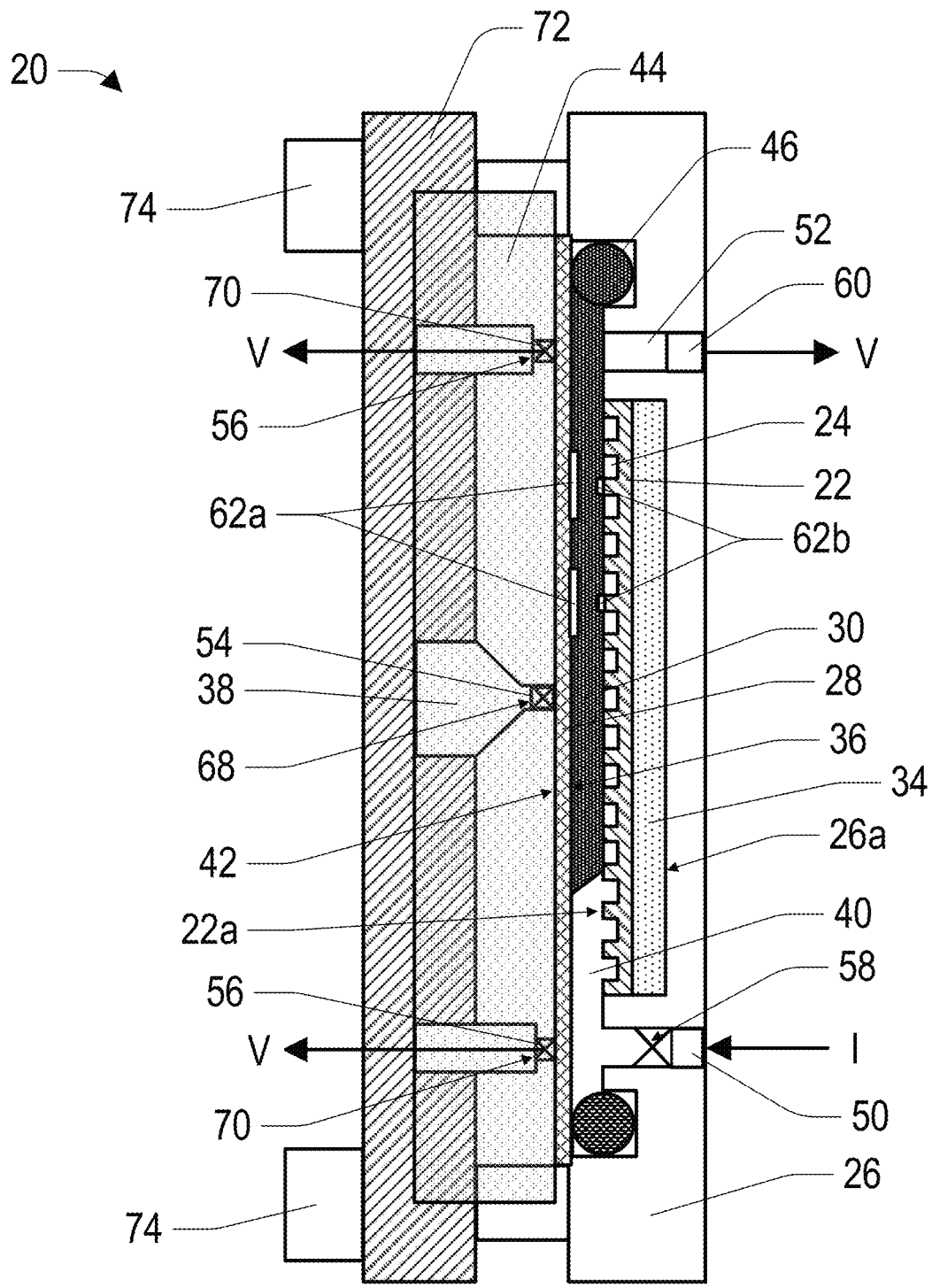
FIG. 5 is a cross-sectional view of the microreactor array platform of FIG. 3 as taken along the line 5-5, and further illustrating filling of the microreactors with reagent, wherein the sealing film second surface is initially not touching the microreactor array surface.

With reference to at least FIGS. 2 and 5, the microreactor array platform 20 may further include a top 72 and one or more fasteners 74. In one embodiment, assembly of the microreactor array platform 20 may involve providing a microreactor array 22. The microreactor array 22 may include one or more microreactors 24. Further, the microreactors may be treated with one or more reagents, functionalizing chemicals, or the like. Thereafter, the microreactor array 22 may be inserted into the cavity 26a within the base 26. Optionally, a compliant layer 34 may be positioned in the cavity 26a beneath the microreactor array 22, one or more shims 32 may be positioned adjacent the microreactor array 22, or a combination thereof.

With the microreactor array 22 positioned within the base 26, the sealing film 28 may be disposed above the upper surface 22a of the microreactor array 22. The window 44 may be positioned above sealing film 28 such that the sealing film is disposed between the window 44 and the microreactor array 22. The top 72 may be positioned over or around the window 44. With the top 72, window 44, sealing film 28, microreactor array 22 and base 26 positioned for assembly, one or more of the fasteners 74 may be used to couple the top 72 to the base 26, thereby providing the assembled microreactor array platform 20. In one aspect, through-holes (not shown) may be positioned at intervals around a perimeter of the top 72. Similarly, the base 26 may include one or more passages or openings (not shown). When assembled, the through-holes and the openings in the base 26 may be aligned to receive at least a portion of the one or more of the fasteners 74 therein. In one example, the through-holes may be smooth cylindrical bores and the openings in the base 26 may be threaded cylindrical bores. Accordingly, a partially threaded bolt may be guided through the through-holes and then threaded or screwed into the openings in the base 26 to secure together the microreactor array platform 20.

EXAMPLES

The following Examples have been presented in order to further illustrate the invention and are not intended to limit the invention in any way.

Methods to generate nucleic acid programmable protein arrays (NAPPA) using embodiments of a microreactor array platform according to the present disclosure are provided. Methods to screen for antibodies in patient serum samples and analyze the results are also provided.

For the fabrication of microreactor arrays, a photolithography mask for a microreactor array was designed using computer aided design (CAD) software (AutoCad, Autodesk, San Rafael Calif.). A 150 mm diameter circle was drawn. Seven microscope slide format slides 25.4 mm×76.2 mm were spaced apart within the circular outline. 50 μm wide cut-lines 'streets' were added between slides for dicing. For each slide, about 14,000 130 μm diameter circles were drawn for the microreactors in a hexagonal closest packing array pattern with 375 μm center-to-center spacing leaving at least 1.33 mm empty areas, without features, at the top and bottom of each slide. These areas were used for autofocus by the microarray scanner. Numbers were placed along the sides and bottom of each slide to identify rows and columns respectively. A logo was included along the bottom of each slide to orient it during the various processing steps of printing, assaying and scanning. 200 μm diameter circles were added outside of the slides for depth measurement during the etching process.

To fabricate photolithography masks for the microreactor array, a photolithography mask drawing was provided to a mask manufacturer (JD Photo-Tools, Oldham UK). '7"×7" chrome glass', 'super-high resolution' (128K dpi), 'darkfield' and 'design viewed from glass side' were specified. Clear areas of the mask (no chrome) correspond to the etched areas of the silicon wafer in subsequent steps.

To pattern silicon wafers, 6" (150 mm) silicon wafers (University Wafer, Boston Mass.) with standard thickness of 675 μm+/−25 μm were obtained. One side of each wafer was coated with 300 nm LPCVD low stress nitride. Nitride was spin coated with 1 μm AZ 3312 (AZ Electronic Materials Inc., Branchburg N.J.) positive photoresist. Samples were then baked at 100° C. for two minutes. Photo resist was exposed with the photolithography mask on mask aligner (OAI, San Jose Calif.), developed in AZ300 MIF developer (AZ Electronic Materials Inc., Branchburg N.J.) for 45 seconds, and hard-baked at 100° C. for 2 minutes. Nitride film was selectively etched with reactive ion etch (RIE) and photoresist was removed with acetone.

To etch microreactors, HNA etchant mixture of 49% hydrofluoric acid (HF), 70% nitric acid (HNO3) and (>98%) glacial acetic acid (CH3COOH) in the ratio of 2.75:1.75:1 was prepared. Wafers were isotropically etched for about 30 minutes to 70 µm depth and 270 µm diameter. Etching silicon with HNA is exothermic so the wafers were agitated to maintain uniform temperature.

To grow an oxide layer, the surface of the wafer was cleaned in piranha mixture (1:1 mixture sulfuric acid ($H_2SO_4$):hydrogen peroxide ($H_2O_2$)) for 15 minutes. Surface was cleaned in buffered oxide etch of hydrofluoric acid (HF) and ammonium fluoride ($NH_4F$) (1:6 mixture of $HF:NH_4F$) for 10 seconds. 95 nm thin film silicon dioxide ($SiO_2$) layer was grown at 1,000° C. for about 1 hour in an oxygen furnace (Tystar 4600, Torrance Calif.).

Wafers were diced along cut-lines (Advotech Company, Inc., Tempe Ariz.) into 7 individual microreactor array slides. Saw blade kerf was 50 µm so actual slide dimensions were 25.35 mm×76.15 mm.

To functionalize surfaces, residual organic materials were cleaned from the microreactor array slides in piranha (1:1 mixture of $H_2SO_4:H_2O_2$) for 30 minutes. After rinsing with DI water and drying with compressed air, slides were immersed in a 2% solution of (3-Aminopropyl) triethoxysilane (APTES) in acetone for 30 minutes. Slides were thoroughly rinsed in acetone and DI water, and dried with compressed air.

To print DNA into microreactors, first plasmid DNA was obtained for a set of genes from the DNASU Plasmid Repository (Center for Personal Diagnostics, Biodesign Institute, Arizona State University, Tempe Ariz.). Clones were sequence verified and inserted in the *E. coli* pen-dual recombination cloning vector open reading frames (ORFs) with the natural stop codon absent and a GST-tag appended to C-terminus.

To purify plasmid DNA, *E. coli* colonies of clone vectors were cultured and harvested. Plasmid DNA was purified from the harvested cultures with a 96 microreactor miniprep (Whatman Filter Plates, Sigma-Aldrich, St. Louis Mo.). Miniprep DNA was transferred to a 384-well microplate. Miniprep plasmid DNA was normalized to 100 ng/µl (Nanodrop 8000, Thermo Scientific, Wilmington Del.) and stored at 4° C. until printing.

To prepare a 1×NAPPA printing-mixture, components were thawed on ice and mixed together in the following order and proportions: 93% nuclease-free DEPC-treated water (Ambion, Life Technologies, Grand Island N.Y.), 0.6% BSA (Sigma-Aldrich), 1% anti-GST antibody (GE Healthcare), 5% BS3 cross-linker (Thermo Scientific, Pierce). The printing mixture was aged at 4° C. for one day to allow partial cross-linking of BS3, and then aliquoted into a 384-well microplate for printing. The printing mixture was stored on ice at all times throughout the process.

Figure 10:
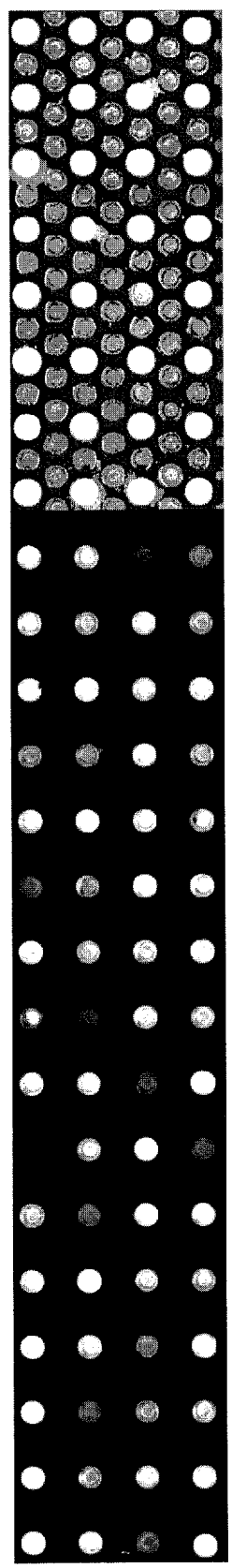
FIG. 10 is an enlarged fluorescent microarray scanner image of an example nucleic acid programmable protein array (NAPPA) subarray processed using a microreactor array platform according to the present disclosure.

Referring to FIG. 10, a microarray printing pattern for the 96 plasmid DNA and the printing-mixture was defined. Each spot containing printing-mixture and plasmid DNA was surrounded with 6 spots containing just the printing-mixture without the plasmids. In this way, expressed proteins that diffuse away from a plasmid spot were captured by the anti-GST antibodies in the printing-mixture of neighboring spots and then easily detected. Brightness and contrast was adjusted on a third of the microarray in FIG. 10 to show spots containing just the printing-mixture without the plasmids and the corresponding actual printing density.

Figure 11:
FIG. 11 is an example optical image rendered with proteins expressed from DNA in small chemical reaction chambers (i.e., microreactors). DNA was printed into the microreactors on a 1"×3" microreactor array. Proteins were expressed in situ from the DNA using IVTT reagent. Microreactors were sealed during expression to prevent diffusion. Varying concentrations of DNA were printed to produce varying intensities of fluorescently labeled protein spots. The image has about 12 kilopixel resolution (108×108 spots) and has a width of about 1.5 inches and a height of about 2 inches. Original photograph of Albert Einstein by Philippe Halsman (Halsman Archive).

To prepare the bitmap pattern for FIG. 11, a digital RGB image was resized to 108×108 pixels using function imresize( ) (Matlab, MathWorks, Natick Mass.). The function imrgb2ind( ) was used to reduce the image to an indexed image with 5 uniformly spaced grayscale intensities, gray (5). The indexed image was then split into two halves to fit on a 1"×3" microscope slide format and converted to a bitmap file using function imind2rgb( ).

The APTES functionalized microreactor array slides were aligned on the deck of a non-contact piezoelectric dispensing microarrayer (Rainmaker-au302, Engineering Arts LLC, Tempe Ariz.) to prepare them for printing as shown in FIG. 10. The au302 alignment system was used to align the microreactors of the slides for continuous non-contact dispensing.

To print microreactor arrays as in FIG. 10, either 8 or 16 piezoelectric dispensers (Engineering Arts LLC, Tempe Ariz.) were used on the au302 microarrayer. Dispensers were primed with DI water. The 384-well microplate with printing-mixture was placed on the deck of the au302 microarrayer and 2 µl printing-mixture was aspirated into each dispenser using on-head aspiration syringes. Twelve 0.1 nl drops of printing-mixture were dispensed in short bursts at 12,500 drops-per-second into microreactors using the predefined microarray pattern defined above. Non-contact piezoelectric on-the-fly dispensing at uniform printhead speed of 175 mm/sec was used. The piezoelectric tips were cleaned by flushing DI water through the dispenser while the dispenser tip was submerged in flowing DI water. Within 10 minutes, the same process was repeated with the 384-well microplate of plasmid DNA. Three drops of plasmid DNA was printed in the same spots as the printing-mixture using the same aspirating and dispensing parameters (12,500 drops-per-second) as for the printing-mixture. Plasmid DNA was not printed into the 6 surrounding microreactors containing just printing-mixture alone. The process of dispensing printing-mixture followed by plasmid DNA was repeated until all of 96 genes were printed.

To print the microarray for the image shown in FIG. 11, DNA and printing mixture were combined and printed onto a microreactor array using a PiXY microarrayer capable of printing colored bitmaps.

To print flat glass slides for p53 serum screening comparison (see FIG. 12), DNA and printing mixture were combined and printed on APTES coated glass microscope slides (Fischer Scientific, Waltham Mass., Cat. No. 12-544-1) using Genetix QArray2 pin-spotter at 2,500 spot density per microscope slide. Printed plasmid DNA microarrays were stored at room temperature in a sealed container with desiccant.

For protein expression, microreactor array slides were first blocked. This step washed away unbound printed molecules from slides' surfaces. A centrifuge (Beckman Coulter model Allegra X-15R, Indianapolis Ind.) was programmed for 3750 RPM, maximum acceleration and maximum deceleration. Slides were submerged in a tray containing 8 ml of Superblock Blocking Buffer in TBS (Thermo Scientific product #37535B, Rockford Ill.). Samples were accelerated up to the maximum speed and decelerated right away. Slides were rinsed in DI water and dried with compressed air.

Figure 12:
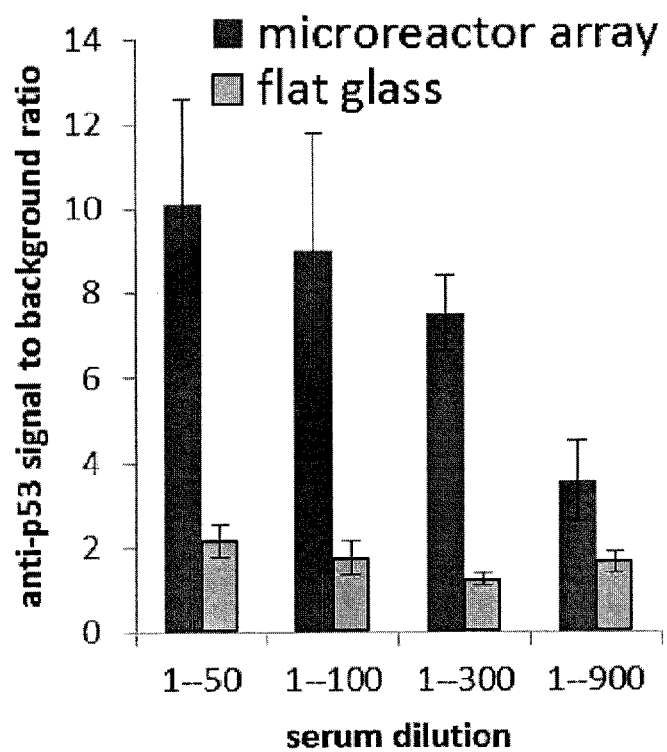
FIG. 12 is a signal to background ratio bar chart of antibody response in patient serum sample detected by proteins expressed on an example microreactor array as compared with a flat glass. Anti-p53 antibody signal to background ratio is plotted as a function of serum dilutions of 1:50, 1:100, 1:300, and 1:900 for both the microreactor array and the flat glass slide.

The same procedure as outlined above for microreactor array slides was used to block glass slides for FIG. 12. The centrifuge was not required. Slides were blocked for one hour on a rocking table (VWR model 200, Radnor Pa.).

In vitro coupled transcription and translation (IVTT) reagent was prepared from the "1-step human in vitro protein expression kit" (Thermo Scientific, Rockford, Ill.). The four components of the kit and were thawed and stored on ice. Components were mixed in the following order and proportions: 34% HeLa lysate, 10% accessory proteins, 22% reaction mix and 34% nuclease-free water, using 60% HeLa lysate compared to the normal recipe. Mixture was stored on ice. Lysate was degassed in a vacuum desiccator until bubbles were gone (approximately 5 minutes).

IVTT reagent was applied to microreactor array slides by first inserting a microreactor array slide into a microreactor array platform according to the present disclosure. An O-ring was positioned around the microarray slide, and a sealing film was placed on top of the O-ring and slide. A window was placed on top of the sealing film and the microreactor array platform was clamped together using fasteners. Vacuum was applied to the reagent outlet port and 300 µl IVTT reagent was injected into the reagent inlet/outlet port. Pressurized sealing liquid was injected into the inlet port in the window to displace the reagent and seal the microreactors.

To apply IVTT reagent to flat glass slides for FIG. 12, a gasket (Hybriwell Sealing System item 440904, Grace Bio-labs, Bend Oreg.) was attached to the slide. Using a manual pipette, 150 µl IVTT reagent was injected into the hole at one end of the gasket.

Glass slides and gasket were incubated at 30° C. for 1.5 hours and then 15° C. for 0.5 hours (EchoTherm chilling incubator, Torrey Pines Scientific, Carlsbad Calif.). The assembled microreactor array platform was incubated at 30° C. for 2 hours and then 15° C. for 1 hour. Incubation times were longer than standard NAPPA on glass slides to accommodate longer heating and cooling times due to the higher thermal mass of the microreactor array platform.

To detect fluorescent signals for FIGS. 10 and 11, proteins were first fluorescently labeled. To preserve molecular functionality, slides were not allowed to dry out between processing steps. A 5% milk-PBST (0.2% Tween) blocking buffer was prepared by combining 500 ml 1× phosphate buffered saline (1×PBS) with 25 grams 100% instant nonfat powdered dry milk and 1 ml Tween 20 detergent and mixed with magnetic stirring bar for 10 minutes. The resulting solution was stored at 4° C. A small tray was filled with blocking buffer. The microreactor array platform was disassembled and the slide was removed and submerged into blocking buffer. Blocking was performed for one hour at room temperature on a rocking table (VWR model 200, Radnor Pa.) with blocking buffer replaced three times. A primary label was prepared by mixing 10 µl mouse anti-GST monoclonal antibody (Cell Signaling Technologies, Danvers Mass.) in 3 ml blocking buffer. Slides were incubated in primary label overnight at 4° C. on a rocking table then rinsed with blocking buffer 3 times for 10 minutes each, replacing blocking buffer each time. Secondary label was prepared by mixing 6 µl Alexa Fluor 647 nm goat anti-mouse IgG antibody (Life Technologies, Grand Island N.Y.) in 3 ml blocking buffer. Slides were incubated in secondary label for 1 hour at room temperature on a rocking table in the dark to prevent photo bleaching of the fluorescent dye. Rinsing buffer was prepared by mixing 500 ml 1×PBS and 1 ml Tween. Slides were rinsed in rinsing buffer three times for 1 minute each time, replacing the rinsing buffer each time. Slides were rapidly rinsed in DI water 6 times replacing water each time and then dried with compressed air and stored in the dark, at room temperature with a desiccator.

To probe serum samples for FIG. 12, following protein expression, slides were blocked in 5% milk-PBST (0.2% Tween) on a rocking table at room temperature for 1 hour. Slides were incubated with diluted serum sample in proplate 4-well tray set (Grace Bio-Labs, OR) at 4° C. overnight. Slides were then washed in 5% milk-PBST (0.2% Tween) three times for 5 min each time. Protein display was detected with Alexa Fluor 647 labeled goat anti-human IgG secondary antibody (Jackson ImmunoResearch, West Grove, Pa.). Finally, slides were washed in DI water and dried with compressed air.

Microreactor array slides were imaged by first programming a fluorescent microarray scanner (PowerScanner, Tecan, Mannedorf Switzerland) for microreactor array slides. Coordinates of the empty areas at the top and bottom of slides were defined for autofocus along with the reflectivity of those areas. A 70 µm offset was defined for microreactor depth after autofocus. Self-adhesive 325 µm thick backing was applied to slides to accommodate 1 mm slide thickness requirement of the scanner. Slides were scanned at 10 µm resolution, 25% laser power (out of 30 mW) and 25% (out of 800% maximum) photo multiplier tube (PMT) detector gain. Data was extracted (Array-Pro, Media Cybernetics, Rockville Md.) and analyzed (Excel, Microsoft, Redmond Wash.). With reference to FIG. 12, signal to background ratio of anti-P53 response was plotted. Signal for each dilution point was the average signal of six spots on the array, and signal of each spot was the median pixel value of that spot. Background was the median signal of all of the spots on the array.

Features suitable for such combinations and sub-combinations would be readily apparent to persons skilled in the art upon review of the present application as a whole. The subject matter described herein and in the recited claims intends to cover and embrace all suitable changes in technology.

The present disclosure has been described in terms of one or more preferred embodiments, and it should be appreciated that many equivalents, alternatives, variations, and modifications, aside from those expressly stated, are possible and within the scope of the disclosure.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

REFERENCES

Angenendt, P., Kreutzberger, J., Glokler, J. & Hoheisel, J. D. 2006. Generation of High Density Protein Microarrays by Cell-Free In Situ Expression of Unpurified PCR Products. Mol Cell Proteomics, 5, 1658-66.

Arnheim, N., Erlich, H. A., Horn, G. T., Mullis, K. B., Saiki, R. K. & Scharf, S. J. 1987. Process for Amplifying, Detecting, and/or-Cloning Nucleic Acid Sequences. US Patent Application. Jul. 28, 1987.

Blake, T. & Dobson, R. 2004. Wetting At High Capillary Numbers. 12th International Coating Science and Technology Symposium. Rochester, N.Y.

Blanchard, A. P., Kaiser, R. J. & Hood, L. E. 1996. High-Density Oligonucleotide Arrays. Biosensors & Bioelectronics, 11, 687-690.

Brenan, C. J., Roberts, D. & Hurley, J. 2009. Nanoliter High-Throughput PCR for DNA and RNA Profiling. Methods Mol Biol, 496, 161-74.

Brown, J. F., Silver, J. E. & Kalinina, O. V. 2000. Method of Sampling, Amplifying and Quantifying Segment of Nucleic Acid, Polymerase Chain Reaction Assembly Having Microliter-Sized Sample Chambers, and Method of Filling Assembly. US Patent Application. Nov. 7, 2000.

Brown, P. & Sahalon, T. D. 1998. Methods for Fabricating Microarrays of Biological Samples. US Patent Application. Sep. 15, 1998.

Chou, C. C., Chen, C. H., Lee, T. T. & Peck, K. 2004. Optimization of Probe Length and the Number of Probes per Gene for Optimal Microarray Analysis of Gene Expression. Nucleic Acids Res, 32, E99.

Chou, S., Krauss, P. R. & Rentstrom, P. J. 1996. Imprint Lithography with 25-Nanometer Resolution. Science, 272, 85-87.

Du, W., Li, L., Nichols, K. P. & Ismagilov, R. F. 2009. Slipchip. Lab Chip, 9, 2286-92.

Dunn, P. A. & Tyrer, H. W. 1981. Quantitation of Neutrophil Phagocytosis, Using Fluorescent Latex Beads. Correlation of Microscopy and Flow Cytometry. J Lab Clin Med, 98, 374-81.

Engvall, E. & Perlmann, P. 1971. Enzyme-Linked Immunosorbent Assay (Elisa). Quantitative Assay of Immunoglobulin G. Immunochemistry, 8, 871-4.

Fodor, S., Pirrung, M. C., Read, J. L. & Stryer, L. 1995. Array of Olignonucleotides on a Solid Substrate. US Patent Application.

Gong, H., Ramalingam, N., Chen, L., Che, J., Wang, Q., Wang, Y., Yang, X., Yap, P. H. & Neo, C. H. 2006. Microfluidic Handling of PCR Solution and DNA Amplification on a Reaction Chamber Array Biochip. Biomed Microdevices, 8, 167-76.

Gosalia, D. N. & Diamond, S. L. 2003. Printing Chemical Libraries on Microarrays for Fluid Phase Nanoliter Reactions. Proc Natl Acad Sci USA, 100, 8721-6.

Greener, J., Li, W., Ren, J., Voicu, D., Pakharenko, V., Tang, T. & Kumacheva, E. 2010. Rapid, Cost-Efficient Fabrication of Microfluidic Reactors In thermoplastic Polymers by Combining Photolithography and Hot Embossing. Lab Chip, 10, 522-4.

Groebe, D. R., Maus, M. L., Pederson, T., Clampit, J., Djuric, S., Trevillyan, J., Lin, C. W., Burns, D. J. & Warrior, U. 2003. Putting Thought to Paper: A Microarcs Protease Screen. J Biomol Screen, 8, 668-75.

He, M., Stoevesandt, O., Palmer, E. A., Khan, F., Ericsson, O. & Taussig, M. J. 2008. Printing Protein Arrays from DNA Arrays. Nat Methods, 5, 175-7.

Inglese, J., Johnson, R. L., Simeonov, A., Xia, M., Zheng, W., Austin, C. P. & Auld, D. S. 2007. High-Throughput Screening Assays for the Identification of Chemical Probes. Nat Chem Biol, 3, 466-79.

Jackman, R. J., Duffy, D. C., Ostuni, E., Willmore, N. D. & Whitesides, G. M. 1998. Fabricating Large Arrays of Microwells with Arbitrary Dimensions and Filling them Using Discontinuous Dewetting. Anal Chem, 70, 2280-7.

Juncker, D. & Pla, M. 2010. Microfluidic Microarray System and Method for the Multiplexed Analysis of Biomolecules. US Patent Application US 2010/0298163.

Kinpara, T., Mizuno, R., Murakami, Y., Kobayashi, M., Yamaura, S., Hasan, Q., Morita, Y., Nakano, H., Yamane, T. & Tamiya, E. 2004. A Picoliter Chamber Array for Cell-Free Protein Synthesis. J Biochem, 136, 149-54.

Kuruvilla, F. G., Shamji, A. F., Sternson, S. M., Hergenrother, P. J. & Schreiber, S. L. 2002. Dissecting Glucose Signalling With Diversity-oriented Synthesis and Small-Molecule Microarrays. Nature, 416, 653-7.

Leamon, J. H., Lee, W. L., Tartaro, K. R., Lanza, J. R., Sarkis, G. J., Dewinter, A. D., Berka, J., Weiner, M., Rothberg, J. M. & Lohman, K. L. 2003. A Massively Parallel Picotiterplate Based Platform for Discrete Picoliter-Scale Polymerase Chain Reactions. Electrophoresis, 24, 3769-77.

Linton, J., Yoder, K., Hess, R., Hasan, L., Ellis, R., Kanigan, T., Friesen, K., Katz, A., Brenan, C., Morrison, T. & Garcia, J. 2010. Assay Apparatus and Method Using Microfluidic Arrays. US Patent Application. Mar. 23, 2010.

Lisi, P. J., Huang, C. W., Hoffman, R. A. & Teipel, J. W. 1982. A Fluorescence Immunoassay for Soluble Antigens Employing Flow Cytometric Detection. Clin Chim Acta, 120, 171-9.

Liu, H. B., Ramalingam, N., Jiang, Y., Dai, C. C., Hui, K. M. & Gong, H. Q. 2009. Rapid Distribution of a Liquid Column into a Matrix of Nanoliter Wells for Parallel Real-Time Quantitative PCR. Sensors and Actuators B: Chemical, 135, 671-677.

Liu, W., Chen, D., Du, W., Nichols, K. P. & Ismagilov, R. F. 2010. Slipchip for Immunoassays in Nanoliter Volumes. Anal Chem, 82, 3276-82.

Ma, H., Horiuchi, K. Y., Wang, Y., Kucharewicz, S. A. & Diamond, S. L. 2005. Microliter Homogenous Ultra-High Throughput Screening Microarray for Lead Discoveries and Ic50 Profiling. Assay and Drug Development Technologies, 3.

Matsubara, Y., Kobayashi, M., Morita, Y. & Tamiiya, E. 2002. Application of a Microchamber Array for DNA Amplification Using a Novel Dispensing Method. Arch Histol Cytol, 65, 481-8.

Mullis, K., Faloona, F., Scharf, S., Saiki, R., Horn, G. & Erlich, H. 1986. Specific Enzymatic Amplification of DNA in Vitro: the Polymerase Chain Reaction. Cold Spring Harb Symp Quant Biol, 51 Pt 1, 263-73.

Nagai, H., Murakami, Y., Morita, Y., Yokoyama, K. & Tamiya, E. 2001. Development of a Microchamber Array for Picoliter PCR. Anal Chem, 73, 1043-7.

Nikkahah, M., Stobl, J., Srinivasaraghavan, V. & Agah, M. 2013. Isotropically Etched Silicon Microarrays for Rapid Breast Cancer Cell Capture. IEEE Sensors Journal, 13, 1125-1131.

Northrup, M. A. & White, R. 1997. Microfabricated Reactor. US Patent Application. Jun. 17, 1997.

Okano, T., Matsuura, T., Suzuki, H. & Yomo, T. 2013. Cell-Free Protein Synthesis in a Microchamber Revealed the Presence of An Optimum Compartment Volume for High-order Reactions. ACS Synth Biol.

Park, J. W. 2007. Nanoliter Reactor Arrays for Antibiotic Study. Bull. Korean Chem. Soc., 28.

Ramachandran, N., Hainsworth, E., Bhullar, B., Eisenstein, S., Rosen, B., Lau, A. Y., Walter, J. C. & Labaer, J. 2004. Self-Assembling Protein Microarrays. Science, 305, 86-90.

Ramakrishnan, R., Dorris, D., Lublinsky, A., Nguyen, A., Domanus, M., Prokhorova, A., Gieser, L., Touma, E., Lockner, R., Tata, M., Zhu, X., Patterson, M., Shippy, R., Sendera, T. J. & Mazumder, A. 2002. An Assessment of Motorola Codelink Microarray Performance for Gene Expression Profiling Applications. Nucleic Acids Res, 30, E30.

Ramalingam, N., Liu, H. B., Dai, C. C., Jiang, Y., Wang, H., Wang, Q., K, M. H. & Gong, H. Q. 2009. Real-Time PCR Array Chip with Capillary-Driven Sample Loading and Reactor Sealing for Point-of-Care Applications. Biomed Microdevices, 11, 1007-20.

Reddy, S., Schunk, P. & Bonnecaze, R. 2005. Dynamics of Low Capillary Number Interfaces Moving Through Sharp Features. Phys. Fluids, 17.

Ressine, A., Marko-Varga, G. & Laurell, T. 2007. Porous Silicon Protein Microarray Technology and Ultra-/Superhydrophobic States for Improved Bioanalytical Readout. Biotechnol Annu Rev, 13, 149-200.

Rissin, D. M., Kan, C. W., Campbell, T. G., Howes, S. C., Fournier, D. R., Song, L., Piech, T., Patel, P. P., Chang, L., Rivnak, A. J., Ferrell, E. P., Randall, J. D., Provuncher, G. K., Walt, D. R. & Duffy, D. C. 2010. Single-Molecule Enzyme-Linked Immunosorbent Assay Detects Serum Proteins At Subfemtomolar Concentrations. Nat Biotechnol, 28, 595-9.

Sakakihara, S., Araki, S., Iino, R. & Noji, H. 2010. A Single-Molecule Enzymatic Assay in a Directly Accessible Femtoliter Droplet Array. Lab Chip, 10, 3355-62.

Sathuluri, R. R., Yamamura, S. & Tamiya, E. 2008. Microsystems Technology and Biosensing. Adv Biochem Eng Biotechnol, 109, 285-350.

Shannon, C. E. & Weaver, W. 1949. The Mathematical theory of Communication, Urbana, University of Illinois Press.

Shockley, W. 1950. Electrons and Holes in Semiconductors, With Applications to Transistor Electronics, New York, Van Nostrand.

Siuti, P., Retterer, S., Choi, C. K., Fowikes, J. & Doktycz, M. Cell Free Translation In Engineered Picoliter Volume Containers. IEEE Proceedings of the First Annual ORNL Biomed Sci Eng Cent Conf., Jun. 19, 2009.

Takatsy, G. 1955. The Use of Spiral Loops in Serological and Virological Micro-Methods. Acta Microbiol Acad Sci Hung, 3, 191-202.

Takulapalli, B. R., Qiu, J., Magee, D. M., Kahn, P., Brunner, A., Barker, K., Means, S., Miersch, S., Bian, X., Mendoza, A., Festa, F., Syal, K., Park, J. G., Labaer, J. & Wiktor, P. 2012. High Density Diffusion-Free Nanowell Arrays. J Proteome Res, 11, 4382-91.

Tsinberg, P., Roycroft, P., Falcovitz-Gerassi, Y. H. & Hahn, S. 2007. Microwell Biochip. US Patent Application. May 15, 2007.

Victor, J., Amjad, H., Alnoor, S. & Jie Zhou, M. 2007. Methods of Sealing Micro Wells. US Patent Application. Dec. 25, 2007.

Victor, J., Huda, A. & Shivji, A. 2012. Apparatus for High Throughput Chemical Reactions. US Patent Application. Aug. 28, 2012.

Vignali, D. A. 2000. Multiplexed Particle-Based Flow Cytometric Assays. J Immunol Methods, 243, 243-55.

Watson, J. D. & Crick, F. H. 1953a. Genetical Implications of the Structure of Deoxyribonucleic Acid. Nature, 171, 964-7.

Watson, J. D. & Crick, F. H. 1953b. Molecular Structure of Nucleic Acids; a Structure for Deoxyribose Nucleic Acid. Nature, 171, 737-8.

Wiktor, T. J., Gyorgy, E., Schlumberger, D., Sokol, F. & Koprowski, H. 1973. Antigenic Properties of Rabies Virus Components. J Immunol, 110, 269-76.

Wirth, T. 2008. Microwells In organic Synthesis and Catalysis, Weinheim, Wiley-Vch.

Woolley, A. T., Hadley, D., Landre, P., Demello, A. J., Mathies, R. A. & Northrup, M. A. 1996. Functional Integration of PCR Amplification and Capillary Electrophoresis in a Microfabricated DNA Analysis Device. Anal Chem, 68, 4081-6.

Yalow, R. S. & Berson, S. A. 1960. Immunoassay of Endogenous Plasma Insulin In Man. J Clin Invest, 39, 1157-75.

Yamamoto, T., Hino, M., Kakuhata, R., Nojima, T., Shinohara, Y., Baba, Y. & Fujii, T. 2008. Evaluation of Cell-Free Protein Synthesis Using PDMS-Based Microwell Arrays. Anal Sci, 24, 243-246.

Zhang, C. & Xing, D. 2007. Miniaturized PCR Chips for Nucleic Acid Amplification and Analysis: Latest Advances and Future Trends. Nucleic Acids Res, 35, 4223-37.

Zhou, X., Cai, S., Hong, A., You, Q., Yu, P., Sheng, N., Srivannavit, O., Muranjan, S., Rouillard, J. M., Xia, Y., Zhang, X., Xiang, Q., Ganesh, R., Zhu, Q., Matejko, A., Gulari, E. & Gao, X. 2004. Microfluidic Picoarray Synthesis of Oligodeoxynucleotides and Simultaneous Assembling of Multiple DNA Sequences. Nucleic Acids Res, 32, 5409-17.

Ziauddin, J. & Sabatini, D. M. 2001. Microarrays of Cells Expressing Defined cDNAS. Nature, 411, 107-10.

The citation of any document is not to be construed as an admission that it is prior art with respect to the present invention.

The invention claimed is:

1. A microreactor array platform comprising:
   a base having a wall defining a cavity in the base and a reagent inlet port;
   a microreactor array including microreactors positioned within the cavity;
   a sealing film positioned above the microreactor array and having a first surface and an opposite second surface having a closer proximity to the microreactors than the first surface, the sealing film configured to movably seal the array of microreactors;
   the sealing film and the microreactor array defining a reagent gap providing a fluid path between the microreactor array and the second surface of the sealing film when the second surface of the sealing film is in spaced relationship with the microreactor array;
   an injector for delivering a reagent into the reagent gap through the reagent inlet port; and
   an applicator for directing a sealing liquid against the first surface of the sealing film through a sealing liquid inlet port positioned above the sealing film,
   wherein the sealing film is impervious to fluids, providing a separation between the reagent and the sealing liquid.

2. The microreactor array platform of claim 1 further comprising:
   a system configured to apply a vacuum to the reagent gap by creating a pressure differential between the reagent in the injector and the reagent gap.

3. The microreactor array platform of claim 1 wherein:
the sealing film is more hydrophobic than an upper surface of the microreactor array.

4. The microreactor array platform of claim 1 wherein:
at least one of the microreactors includes functionalizing chemicals dispersed thereon.

5. The microreactor array platform of claim 1 wherein:
at least a portion of the sealing film includes functionalizing chemicals dispersed on the second surface.

6. The microreactor array platform of claim 1 further comprising:
multiple chemical spots including:
initiating functionalizing chemical spots; and
reacting functionalizing chemical spots, wherein the initiating functionalizing chemical spots and the reacting functionalizing chemical spots are arrayed separately onto the upper surface of the microreactor array and second surface that comes into contact with the array of microreactors, the initiating functionalizing chemical spots and the reacting functionalizing chemical spots being aligned with each other thus enabling multiplexed combinatorial chemical reactions.

7. The microreactor array platform of claim 1 further comprising:
a window including the sealing liquid inlet port.

8. The microreactor array platform of claim 1 further comprising:
a reagent outlet port for injecting or removing the reagent.

9. The microreactor array platform of claim 1 wherein:
the microreactor array platform includes a sealing liquid and a reagent, and
the viscosity of the sealing liquid is higher than the viscosity of the reagent.

10. The microreactor array platform of claim 1 wherein:
the applicator comprises one of a pneumatic source, a hydraulic source or a mechanical spring source.

11. A method for sealing a reagent in microreactors of an array of microreactors, the method comprising:
(a) providing the microreactor array platform of claim 1,
(b) injecting the reagent into the microreactor array using the injector; and
(c) directing, using the applicator, a sealing liquid against the first surface of the sealing film to achieve a contact of at least a portion of the second surface with the microreactor array,
wherein the sealing film is impervious to fluids, providing a separation between the reagent and the sealing liquid.

12. The method of claim 11 wherein: the microreactor array platform further comprises a system configured to apply a vacuum to the reagent gap by creating a pressure differential between the reagent in the injector and the reagent gap; and
the method further comprises applying a vacuum to the reagent gap using the system via a pressure differential generated by the system.

13. The method of claim 11 wherein:
at least one of the microreactors includes functionalizing chemicals dispersed thereon.

14. The method of claim 11 further comprising:
contacting initiating functionalizing chemical spots with reacting functionalizing chemical spots, wherein the initiating functionalizing chemical spots and the reacting functionalizing chemical spots are arrayed separately onto the upper surface of the microreactor array and second surface that comes into contact with the array of microreactors, the initiating functionalizing chemical spots and the reacting functionalizing chemical spots being aligned with each other thus enabling multiplexed combinatorial chemical reactions.

15. The method of claim 11 wherein:
the microreactor array platform further comprises a window configured with a window inlet port and a window outlet port for flowing the sealing liquid; and
the method further comprises applying a vacuum using the system via at least one of the window outlet port and window inlet port to maintain at least a portion of the reagent gap open.

16. The method of claim 11 wherein:
the microreactor array platform further comprises a base outlet port for injecting or removing the reagent; and
the method further comprises directing the sealing liquid against the first surface of the sealing film and displacing the reagent from the microreactor array platform via at least one of the base inlet port and base outlet port.

17. The method of claim 11 wherein:
the sealing liquid is injected against the first surface of the sealing film via a pressure differential generated by the system.

18. The microreactor array platform of claim 1 wherein:
an upper surface of the microreactor array does not extend above a top of the cavity, and
the second surface of the sealing film contacts a top surface of the wall of the base.

* * * * *